US012798966B2

(12) United States Patent
Sugita et al.

(10) Patent No.: US 12,798,966 B2
(45) Date of Patent: Nov. 17, 2026

(54) METHOD FOR PRODUCING SODIUM BOROHYDRIDE

(71) Applicant: NIPPON LIGHT METAL COMPANY, LTD., Tokyo (JP)

(72) Inventors: Kaoru Sugita, Shizuoka (JP); Yuji Oota, Shizuoka (JP); Yo Rene Abe, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 572 days.

(21) Appl. No.: 18/228,889

(22) Filed: Aug. 1, 2023

(65) Prior Publication Data

US 2023/0373786 A1 Nov. 23, 2023

Related U.S. Application Data

(63) Continuation of application No. PCT/JP2022/002734, filed on Jan. 25, 2022.

(30) Foreign Application Priority Data

Feb. 5, 2021 (JP) ................................ 2021-017839

(51) Int. Cl.
*C01B 6/21* (2006.01)

(52) U.S. Cl.
CPC ..................................... *C01B 6/21* (2013.01)

(58) Field of Classification Search
None
See application file for complete search history.

(56) References Cited

U.S. PATENT DOCUMENTS

| | | | |
|---|---|---|---|
| 3,471,268 | A | 10/1969 | Claude et al. |
| 3,505,035 | A | 4/1970 | Horn et al. |
| 6,358,488 | B1 | 3/2002 | Suda |
| 2007/0128509 | A1 | 6/2007 | Hong |
| 2009/0214409 | A1 | 8/2009 | Chin et al. |
| 2011/0286913 | A1 | 11/2011 | Lugtigheid |
| 2017/0183236 | A1 | 6/2017 | Yoshizaki |

(Continued)

FOREIGN PATENT DOCUMENTS

| | | | |
|---|---|---|---|
| CN | 2006104055 | A | 4/2006 |
| CN | 101195489 | A | 6/2008 |
| CN | 101407918 | | 4/2009 |

(Continued)

OTHER PUBLICATIONS

Extended European Search Report dated Apr. 23, 2025 issued for European patent application No. 22749558.7.

(Continued)

*Primary Examiner* — Sheng H Davis
(74) *Attorney, Agent, or Firm* — RANKIN, HILL & CLARK LLP

(57) ABSTRACT

Provided is a method for producing sodium borohydride. An aluminum powder and a fluoride powder are mixed, and a pretreatment thereof is carried out at 100° C. or higher and 330° C. or lower; and after the pretreatment, a sodium borate is added and mixed, and the resulting mixture is charged into a tightly sealed vessel; and then after a hydrogen gas is introduced thereto, a heat treatment is carried out by heating the tightly sealed vessel at 490° C. or higher and 560° C. or lower.

6 Claims, 20 Drawing Sheets

(56) References Cited

U.S. PATENT DOCUMENTS

| | | | |
|---|---|---|---|
| 2022/0274832 A1 | 9/2022 | Sugita et al. | |

FOREIGN PATENT DOCUMENTS

| | | | | |
|---|---|---|---|---|
| CN | 101407919 | A | | 4/2009 |
| CN | 101519187 | A | | 9/2009 |
| CN | 101519188 | A | | 9/2009 |
| CN | 101654223 | A | | 2/2010 |
| CN | 102300804 | A | | 12/2011 |
| CN | 104086576 | A | | 10/2014 |
| CN | 105502292 | A | | 4/2016 |
| CN | 106414314 | A | | 2/2017 |
| CN | 106477523 | A | | 3/2017 |
| CN | 107311110 | A | | 11/2017 |
| CN | 108545699 | A | | 9/2018 |
| EP | 1914198 | A2 | | 4/2008 |
| EP | 3156364 | A1 | | 4/2017 |
| EP | 4011825 | A1 | | 6/2022 |
| GB | 790164 | A | | 2/1958 |
| GB | 832049 | A | | 4/1960 |
| GB | 879446 | A | | 10/1961 |
| GB | 1047311 | | * | 10/1964 |
| GB | 1059622 | A | | 2/1967 |
| JP | 2809666 | B2 | | 7/1998 |
| JP | 2004-10446 | A | | 1/2004 |
| JP | 2006143537 | A | | 6/2006 |
| JP | 2006298734 | A | | 11/2006 |
| JP | 2007284675 | A | | 11/2007 |
| JP | 2014181174 | A | | 9/2014 |
| JP | 5839337 | B1 | | 1/2016 |
| JP | 2019189483 | A | | 10/2019 |
| KR | 10-1853745 | | | 5/2018 |
| RU | 2689587 | C1 | | 5/2019 |
| SU | 230108 | A1 | | 2/1969 |
| WO | 2015/190403 | A1 | | 12/2015 |
| WO | 2015190004 | A1 | | 12/2015 |
| WO | 2021/025068 | A1 | | 2/2021 |

OTHER PUBLICATIONS

Extended European Search Report dated Apr. 23, 2025 issued for European patent application No. 22749559.5.

Korean Written Decision on Registration dated Sep. 25, 2024 for Korean Application No. 10-2022-7003171 and its English machine translation.

Liu et al., "Sodium Borohydride Synthesis by Reaction of Na2O contained Sodium Borate with Al and Hydrogen", Energy & Fuels, 2007, vol. 21, No. 3, pp. 1707-1711.

Taiwanese Office Action (TWOA) dated Feb. 19, 2021 for Taiwanese Patent Applicatoin No. 109126355 and its English machine translation.

International Search Report (ISR) dated Oct. 13, 2020 filed in PCT/JP2020/030034.

Russian Office Action (RUOA) dated Sep. 13, 2022 for Russian Patent Application No. 2022102396; English translation.

Australian Office Action (AUOA) dated Dec. 21, 2022 issued in Australian patent application No. 2020325127.

Jianfeng, Mao et al., "Recent Advances in the Use of Sodium Borohydride as a Solid State Hydrogen Store", Energies, 2015, vol. 8, pp. 430-453.

Chinese Office Action (CNOA) dated Mar. 24, 2023 for Chinese Patent Application No. 202080054489.4; English machine translation.

Wei, "Study on Anode Nanocatalysts for Direct Borohydride-Hydrogen Peroxide Fuel Cell", Chinese Master's Theses Full-text Database (CNFD), Engineering Technology Part I, 2016; English abstract.

J.B. et al., "Aluminum chloride for accelerating hydrogen generation from sodium borohydride", Journal of Power Sources 192, Elsevier, 2009, pp. 310-315.

Martelli et al., "Stability and Decomposition of NaBH4", The Journal of Physical Chemistry C, 2010, vol. 114, No. 15, pp. 7173-7177.

International Search Report (ISR) dated Oct. 13, 2020 filed in PCT/JP2020/030035.

Taiwanese Office Action (TWOA) dated Mar. 22, 2021 Taiwanese Patent Application No. 109126352 and its English machine translation.

Indian Office Action (INOA) dated Mar. 15, 2022 for Indian Patent Application No. 202247003185.

Russian Office Action (RUOA) dated Sep. 21, 2022 for Russian Patent Application No. 2022102387; English translation.

Chinese Office Action (CNOA) dated Mar. 27, 2023 for CN202080054242.2; English machine translation.

_IU et al., "Preparation of Sodium Borohydride and Hydrogen Production by Hydrolysis", Chemical Industry and Engineering Progress, 2009, vol. 28, pp. 208-213 and its English machine translation, total 18 pages.

Taiwanese Office Action issued 11.4.2022 in Taiwanese Application. No. 111104095 and its English machine translation.

Taiwanese Examination opinion notification issued on 10.6.2022 for Taiwanese application No. 111103650 and its English machine translation.

International Search Report (ISR) dated Apr. 5, 2022 filed in PCT/JP2022/002731.

International Search Report (ISR) dated Apr. 5, 2022 filed in PCT/JP2022/002734.

Extended European Search Report (EESR) dated Aug. 10, 2023 and issued in European Patent Application No. 20850821.8.

Extended European Search Report (EESR) dated Aug. 10, 2023 and issued in European Patent Application No. 20850574.3.

Australian Office Action (AUOA) dated in Jul. 21, 2023 and issued in Australian application No. 2020327321.

Korean Office Action (KROA) dated Jan. 4, 2024 issued in Korean patent application No. 10-2022-7003171 and its English machine translation.

Chinese Office Action (CNOA1) dated Mar. 12, 2026 for Chinese Application No. 202280013123.1; English translation.

Chinese Office Action (CNOA2) dated Mar. 2, 2026 for Chinese Application No. 202280013376.9; English translation.

* cited by examiner

METHOD FOR PRODUCING SODIUM BOROHYDRIDE

CROSS-REFERENCE TO RELATED APPLICATION(S)

This application is a continuation of PCT international application Ser. No. PCT/JP2022/002734 filed on Jan. 25, 2022 which designates the United States, incorporated herein by reference, and which claims the benefit of priority from Japanese Patent Application No. 2021-017839, filed on Feb. 5, 2021, incorporated herein by reference.

BACKGROUND

1. Technical Field

The present invention relates to a method for producing sodium borohydride, more specifically to a method for producing sodium borohydride from sodium metaborate.

BACKGROUND

2. Description of the Related Art

While a hydrogen fuel receives an attention as the alternative fuel of a fossil fuel, sodium borohydride (SBH) is a promising hydrogen carrier in storage, transportation, and generation of hydrogen. In order to propagate sodium borohydride as the hydrogen carrier in a society, it is indispensable to establish the best production method thereof with keeping a mass production technology in mind.

A known example of the production method of sodium borohydride includes, as disclosed in Japanese Patent No. 2809666, the method in which a trialkyl borate and sodium aluminum hydride are caused to react to give sodium borohydride.

In International Patent Application Laid-open No. 2015/190403, the method of producing sodium borohydride is disclosed, including the process at which sodium metaborate and aluminum particles are caused to react with crushing and rolling them by using a stirring medium to obtain sodium borohydride.

In Japanese Patent Application Laid-open No. 2019-189483, the method of producing sodium borohydride is disclosed in which at the time of producing sodium borohydride, rolling and crushing are carried out in a tightly sealed vessel by using a ceramic ball as the crushing medium.

Bin Hong LIU and 4 researchers, "Sodium Borohydride Synthesis by Reaction of Na2O Contained Sodium Borate with Al and Hydrogen", Energy & Fuels, 2007, Vol. 21, No. 3, pp. 1707-1711 discloses the method of producing sodium borohydride in which sodium diborate ($Na_4B_2O_5$) and sodium oxide ($Na_2O$) are caused to react with aluminum and hydrogen under the molten state thereof at a high temperature (855 K (581° C.), preferably 873 K (599° C.)) to obtain sodium borohydride.

However, in the proposal of Japanese Patent No. 2809666, there is a problem in that the production process thereof is cumbersome because it is necessary that in advance boric acid is converted to a trialkyl borate, and then, this is caused to react with sodium, aluminum, and hydrogen to form sodium aluminum hydride.

In the proposal of International Patent Application Laid-open No. 2015/190403, sodium borohydride is produced by the method in which dried anhydrous sodium metaborate ($NaBO_2$) and aluminum particles having the diameter of about 3 mm are charged into the reaction portion that is rotatably arranged in a cylindrical reaction vessel, and then, they are rolled and crushed in the reaction vessel by using a stirring medium (steel balls having the diameter of about 30 mm) to obtain sodium borohydride. In this method, however, there is a problem in that when the rolling and crushing is carried out for a long period of time, the aluminum particles to be crushed become so small that it is difficult to crush the particles, thereby causing the reaction not to undergo any further.

In the proposal by Japanese Patent Application Laid-open No. 2019-189483, because the ceramic balls are used as the crushing medium in the tightly sealed vessel at the time of producing sodium borohydride, the reaction product becomes the state of a high density by the roll-crushing while the ceramic balls continue to crush the product; as a result, when the size and the shape of the aluminum particles reach the point at which they are too small to be crushed by the roll-crushing, the new surface that is necessary for the reaction cannot be generated so that the reaction cannot undergo any further, resulting in the decrease in the reaction yield. In addition, the ceramic balls are used in the equipment, so that the charging amount of the raw material is limited.

In the proposal by Bin Hong LIU and 4 researchers, "Sodium Borohydride Synthesis by Reaction of Na2O Contained Sodium Borate with Al and Hydrogen", Energy & Fuels, 2007, Vol. 21, No. 3, pp. 1707-1711, sodium hydroxide is added to sodium metaborate, which is followed by heating to obtain an aqueous solution thereof; then, after sodium diborate ($Na_4B_2O_5$) containing sodium oxide ($Na_2O$), which is synthesized by thermal dehydration, or sodium metaborate is prepared, this is caused to react under a molten state thereof at a high pressure of 2.3 MPa. To melt the sodium diborate, however, it was necessary to bring the temperature to a high temperature (around 855 K (581° C.), preferably around 873 K (599° C.)), and the mole ratio of sodium metaborate to sodium oxide needed to be made 3:2 in order to obtain the high reaction yield of 65.8%. When the mole ratio was made low, there was a problem in that the reaction yield is dramatically decreased, resulting in 0% of the reaction yield in sodium metaborate itself under a solid state at the temperature described above.

SUMMARY

It is an object of the present invention to at least partially solve the problems in the conventional technology.

A method for producing sodium borohydride according to a first embodiment, the method comprising: mixing an aluminum powder and a fluoride powder and carrying out a pretreatment (first pretreatment) thereof at 100° C. or higher and 330° C. or lower; and after the pretreatment, adding and mixing a sodium borate, charging the resulting mixture into a tightly sealed vessel, introducing a hydrogen gas, and carrying out a heat treatment by heating the tightly sealed vessel at 490° C. or higher and 560° C. or lower.

A method for producing sodium borohydride according to a second embodiment, the method comprising: mixing an aluminum powder, sodium hydroxide, and a fluoride powder under an atmosphere of 10% or less of humidity and carrying out a pretreatment (second pretreatment) thereof at 100° C. or higher and 330° C. or lower; and after the pretreatment, adding and mixing a sodium borate, charging the resulting mixture into a tightly sealed vessel, introducing a hydrogen gas, and carrying out a heat treatment by heating the tightly sealed vessel at 490° C. or higher and 560° C. or lower.

A method for producing sodium borohydride according to a third embodiment, the method comprising: mixing an aluminum powder and a sodium hydroxide powder under an atmosphere of 10% or less of humidity, and after heating at 100° C. or higher and 330° C. or lower, adding and mixing a fluoride powder and a sodium borate, charging the resulting mixture into a tightly sealed vessel, and carrying out a pretreatment (third pretreatment) thereof at 400° C. or higher and 560° C. or lower; and then, carrying out a heat treatment by heating the tightly sealed vessel under a hydrogen gas atmosphere at 490° C. or higher and 560° C. or lower.

A method for producing sodium borohydride according to a fourth embodiment, the method comprising: after mixing an aluminum powder, a sodium hydroxide powder, a fluoride powder, and a sodium borate under an atmosphere of 10% or less of humidity, charging the resulting mixture into a tightly sealed vessel, evacuating and then sealing the tightly sealed vessel, and carrying out a pretreatment (fourth pretreatment) thereof at 400° C. or higher and 560° C. or lower; and then, carrying out a heat treatment by heating the tightly sealed vessel under a hydrogen gas atmosphere at 490° C. or higher and 560° C. or lower.

According to any one of first to fourth embodiments, during a course of the heat treatment, a reaction product is crushed, and the heat treatment is continued at 450° C. or higher and 560° C. or lower.

According to any one of first to fourth embodiments, the sodium borate is one or more substances selected from sodium metaborate and sodium tetraborate.

According to any one of first to fourth embodiments, the fluoride powder is one or more substances selected from sodium fluoride (NaF), sodium hexafluoroaluminate ($Na_3AlF_6$), potassium fluoride (KF), potassium aluminum fluoride ($KAlF_4$), aluminum fluoride ($AlF_3$), and lithium fluoride (LiF).

According to any one of first to fourth embodiments, a mole ratio of aluminum in the aluminum powder to boron in the sodium borate is 4/3 or more.

According to any one of first to fourth embodiments, a mole ratio of a total amount by mole of an alkali metal and an alkali earth metal, and an alkali metal and an alkali earth metal included in the sodium borate to an amount by mole of boron included in the sodium borate is 1.0 or more and 1.3 or less.

Advantageous Effects of Invention

According to first to fourth embodiments, the methods for producing sodium borohydride not using a large production facility can be provided.

DETAILED DESCRIPTION OF THE PREFERRED EMBODIMENTS

First Embodiment

Figure 1:
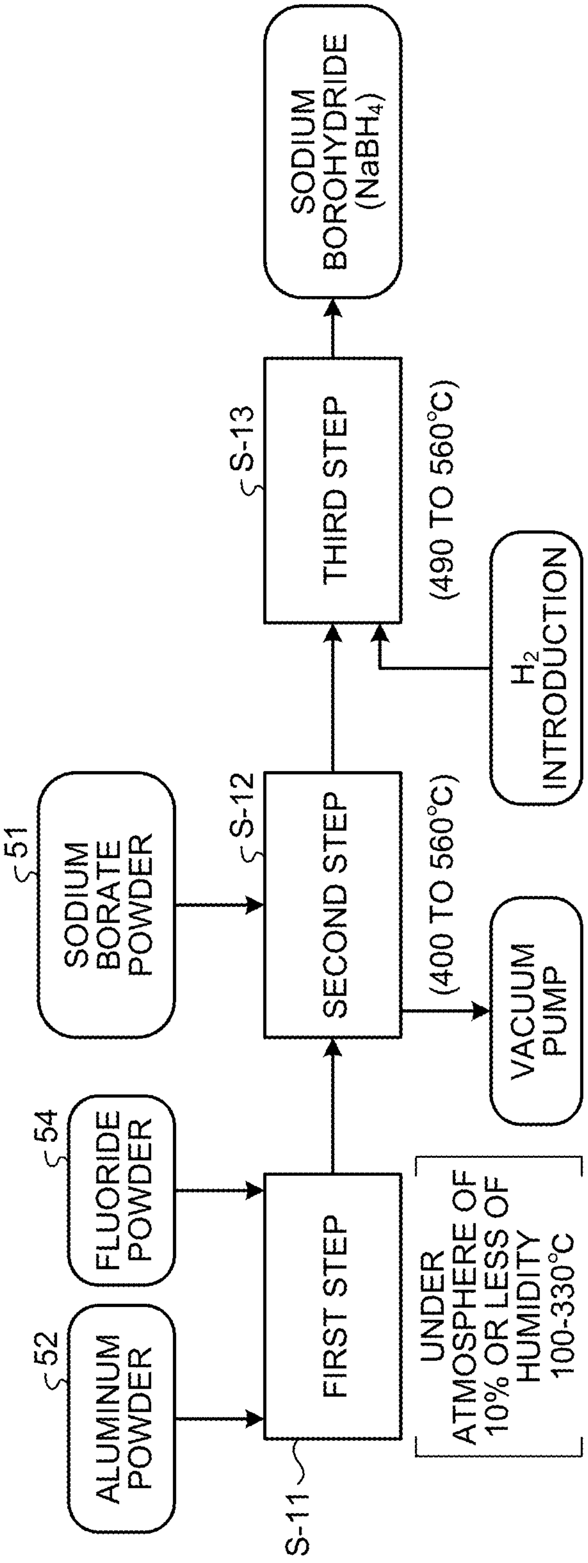
FIG. 1 is the process chart to produce sodium borohydride (SBH) according to the first embodiment in which a sodium borate is used as a raw material.

FIG. 1 is the process chart to produce a sodium borohydride (SBH) according to a first embodiment in which a sodium borate is used as a raw material.

In the method for producing sodium borohydride according to the first embodiment, an aluminum powder and a fluoride powder are mixed, and then, the resulting mixture is heated in advance at the temperature of 100° C. or higher and 330° C. or lower; then, after they are mixed with the sodium borate, the resulting mixture is charged into a tightly sealed vessel and caused to react in the tightly sealed vessel filled with a hydrogen gas at the temperature of 490° C. or higher and 560° C. or lower. Both the sodium borate and the aluminum powder are reacted as they are in the solid phase state. The method for producing sodium borohydride according to the first embodiment includes, as illustrated in FIG. 1, the steps from a first step (S-11) to a third step (S-13). In the following description, the treatment at the first step is sometimes described as “first pretreatment”.

Specifically, illustrative examples of the sodium borate (sodium borate powder) 51 as the borate raw material include borax (sodium tetraborate: $Na_2B_4O_7$), sodium metaborate ($NaBO_2$ (=$Na_2B_2O_4$)), sodium diborate ($Na_4B_2O_5$), or a mixture of at least two of them, but not limited to these.

In this embodiment, a Na/B ratio (mole ratio), which is the ratio of total of the alkali metal and the alkali earth metal in the entire raw material to boron (B) in the sodium borate, is preferably in the range of more than 0.9 to 1.6 or less, and more preferably in the range of more than 1.1 to 1.4 or less.

Hereinafter, the explanation will be made by using the sodium metaborate powder as the example of the sodium borate.

In this embodiment, the particle diameter of the sodium metaborate powder is 100 μm or less. When the particle diameter of the sodium metaborate powder is more than 100 μm, the production efficiency of the sodium borohydride can decrease. Here, the sodium metaborate powder is the raw material having, after this is crushed to fine powders to some extent, passed through the sieve having an opening of 100 μm. To further increase the production efficiency of the sodium borohydride, it is preferable to use the sodium metaborate powder having a smaller particle diameter. For this, the sodium metaborate powder having passed through the sieve having the opening of less than 100 μm (for example, a sieve having the opening of 50 μm or less) may be used.

The mass of the sodium metaborate as the raw material may be determined in accordance with the intended production amount of the sodium borohydride. Note that because the sodium metaborate includes water, it is necessary to estimate somewhat a larger quantity with taking the mass reduction of water due to this into consideration.

The aluminum that can be used as the raw material may be a powdery material or broken pieces such as a scrap material. The aluminum broken piece that can be used may be scrap materials such as chips and waste materials; but it is preferable to select those containing metal impurities that are nobler than aluminum in which the content thereof is preferably as low as possible.

The average particle diameter of the aluminum to be charged is, for example, 1 μm or more, and the maximum particle diameter thereof is preferably 10 mm or less. When the average particle diameter of the aluminum is less than 1 μm, this is prone to cause powder explosion, so that the handling thereof becomes difficult; in addition, the particles are prone to attach to each other thereby causing agglomeration. When the particle diameter thereof is more than 10 mm, the specific surface area per mass decreases thereby resulting in the decrease in the reaction area, so that the initial reaction rate can dramatically decrease. The average particle diameter of the aluminum is more preferably 5 μm or more and 5 mm or less. The average particle diameter may be obtained as the particle diameter of the sphere-corresponding diameter thereof measured by the laser diffraction type particle diameter distribution measurement instrument.

The fluoride, which is the additive, is one or more substances selected from sodium fluoride (NaF), sodium hexafluoroaluminate ($Na_3AlF_6$), potassium fluoride (KF), potassium aluminum fluoride ($KAlF_4$), aluminum fluoride ($AlF_3$), and lithium fluoride (LiF). Among these, sodium fluoride, which is the fluoride of an alkali metal, is especially preferable.

Here, the fluoride is added in order to enhance the reaction yield of the sodium borohydride and the efficiency of the particle stirring reaction. The fluoride has an action to assist crystallization of an alumina, so that the aluminum ion does not elute from the crystallized alumina. In the reaction system, the concentration of the aluminum ion decreases, thereby increasing the relative concentration rate of the sodium ion. When the activity of the sodium ion increases, the reducing power of the aluminum increases thereby enabling to enhance formation of sodium hydride (NaH). In addition, a sodium aluminum fluoride layer (NaAlF layer) is formed by the fluoride on the aluminum surface, thereby forming a lower fluorinated aluminum ($AlF_{1.5}$) that has a strong reducing power. The lower fluorinated aluminum migrates from the aluminum surface to outside thereof to reduce sodium oxide ($Na_2O$) thereby increasing the formation amount of the sodium hydride (NaH); and thus, the chance of the reaction to the sodium borohydride (SBH) increases, and also the chemical equilibrium shifts to the hydride side to increase the reaction yield.

Hereinafter, the “particle stirring reaction” by addition of the fluoride is going to be described.

At the initial period of the reaction, by stirring, sodium metaborate ($NaBO_2$) contacts with an aluminum (Al) particle, so that the sodium metaborate attaches to the aluminum (Al) particle. Due to this attachment, the aluminum oxide film on the surface of aluminum (Al) absorbs sodium oxide ($Na_2O$) to become sodium aluminum dioxide ($NaAlO_2$); then, by the catalytic action of the fluoride ion, this changes to an iota alumina ($0.67Na \cdot 6Al \cdot 9.33O$), thereby helping the sodium ion readily pass through the oxide film on the surface of aluminum (Al). This iota alumina forms the layer on the surface of aluminum (Al). Inside of the thin oxide film layer (about 100 nm to 2000 nm) that is changed to the iota alumina at the initial period of the reaction, the sodium oxide ($Na_2O$), which is formed by the change of sodium aluminum dioxide ($NaAlO_2$) to the iota alumina, becomes sodium (Na) by the reducing action of aluminum (Al); then, this sodium (Na) reduces hydrogen ($H_2$) to become sodium hydride (NaH). At this time, the aluminum is oxidized to aluminum oxide ($Al_2O_3$).

On the other hand, because of the high concentration Na ion present, the simultaneously formed aluminum oxide ($Al_2O_3$) is immediately neutralized by the sodium oxide ($Na_2O$) to become the sodium aluminum dioxide ($NaAlO_2$). When the fluoride ion is present, due to the catalytic action thereof, the sodium aluminum dioxide ($NaAlO_2$) is crystallized as the iota alumina (0.67Na·6Al·9.33O) thereby releasing the sodium oxide ($Na_2O$). This iota alumina often takes a needle-like or a rod-like crystal shape.

It is presumed that the iota alumina becomes the needle-like crystal due to the reaction in which the crystal thereof grows with releasing sodium oxide ($Na_2O$) during the course of crystallization. Namely, it is presumed that the crystal grows preferentially to the direction where the concentration of sodium oxide ($Na_2O$) decreases; and thus, the iota alumina grows in the shape that extends to one direction, resulting in the needle-like crystal of the iota alumina (rod-like crystal when the temperature is low, because the crystal growth is slow).

Under the reaction condition of 490° C. or higher, the sodium borohydride (SBH) is in a molten state; thus, this becomes a solvent of the sodium hydride (NaH), the sodium oxide ($Na_2O$), the aluminum ion, the fluoride ion, and so forth, and fills the iota alumina layer thereby serving as the medium of the mass transfer. In particular, the sodium hydride is highly soluble because this is the hydride, too; and thus, this can readily migrate through the sodium borohydride (SBH).

The sodium hydride (NaH) formed inside of the iota alumina layer contacts with the sodium metaborate ($NaBO_2$) near the surface of the aluminum particle, thereby reacting to produce the sodium borohydride (SBH) and the sodium oxide ($Na_2O$).

Also, the sodium hydride (NaH) is dissolved in the sodium borohydride (SBH) that exudes out to the surface of the aluminum particle, so that this adheres with the sodium metaborate ($NaBO_2$) thereby reacting with the sodium metaborate ($NaBO_2$) to further produce the sodium borohydride ($NaBH_4$=SBH) and the sodium oxide ($Na_2O$).

On the other hand, the sodium ion moves with the fastest speed in the iota alumina. When the gap among the needle-like crystals of the iota alumina is filled with the sodium borohydride (SBH), this gap among the needle-like crystals becomes the passing channel for the sodium ion, the boron ion, the oxygen ion, the aluminum ion, and the fluoride ion. Accordingly, when the sodium ion, the boron ion, the oxygen ion, the aluminum ion, and the fluoride ion pass through the iota alumina layer, the conversion reaction to the sodium borohydride (SBH) takes place inside of the iota alumina layer, too.

As described above, when the sodium hydride (NaH) is formed and the sodium borohydride (SBH) fills the iota alumina layer, thereby resulting in the condition that the reaction can take place inside and outside of the iota alumina layer of the aluminum (Al) particle as well as on the surface of the sodium metaborate ($NaBO_2$) particle, the aluminum (Al) particle and the sodium metaborate ($NaBO_2$) particle contact to each other by stirring; then, the substances including the raw materials, the product intermediates, and the products repeat attachment and separation on the particle surface. As a result, the high-speed migration of the sodium borohydride (SBH), the sodium hydride (NaH), the sodium oxide ($Na_2O$), the sodium metaborate ($NaBO_2$), and the aluminum ion, which is impossible by a mere diffusion, can be realized, so that the formation reaction to the sodium borohydride (SBH) is facilitated.

Besides the action to facilitate crystallization to the iota alumina (0.67Na·6Al·9.33O) as described above, the action of the fluoride is to form a NaAlF layer (the system of a mixture of cryolite ($Na_3AlF_6$), sodium fluoride (NaF), aluminum fluoride ($AlF_3$), and a lower fluorinated aluminum) on the aluminum surface; then, this reacts with the aluminum to form the lower fluorinated aluminum (this is presumed to be $AlF_{1.5}$), which is a strong reducing substance. This lower fluorinated aluminum together with hydrogen reduces the sodium oxide ($Na_2O$) to form the sodium hydride (NaH), the aluminum oxide ($Al_2O_3$), and the sodium fluoride (NaF), as described by the formula (1) below. Addition of the fluoride causes the raw aluminum to become the lower fluorinated aluminum and reduce the sodium oxide ($Na_2O$) to the sodium hydride (NaH).

The sodium hydride (NaH) migrates not only using the sodium borohydride (SBH) as the solvent, but also in the gas phase with subliming a part of sodium hydride (NaH). The lower fluorinated aluminum ($AlF_{1.5}$) also vaporizes, so that migration also takes place in the gas phase, thereby producing sodium hydride (NaH) and alumina in places other than the aluminum surface. In particular, when the reaction yield increases thereby decreasing concentration of the sodium oxide ($Na_2O$), the migration of the lower fluorinated aluminum ($AlF_{1.5}$) in the gas phase helps to increase the concentration of sodium hydride (NaH) in the reaction system thereby resulting in improvement of the reaction yield.

$$2AlF_{1.5}+3Na_2O+3/2H_2\rightarrow 3NaF+3NaH+Al_2O_3 \quad (1)$$

Under these circumstances, the formation reaction of the sodium hydride (NaH) takes place mainly on the surface of the aluminum (Al) particle, while the formation reaction of the sodium borohydride (SBH) can take place inside of the iota alumina layer, outside of the iota alumina layer, and at the sodium metaborate ($NaBO_2$) particle.

The raw material sodium metaborate ($NaBO_2$), together with sodium oxide ($Na_2O$), also contacts with the aluminum (Al) particle, thereby resulting in a circulation reaction.

As described above, due to the contact of the particles to each other, mass transfer of the raw material sodium metaborate ($NaBO_2$), the intermediates (NaH, $Na_2O$, and $AlF_{1.5}$), and the sodium borohydride (SBH) as the solvent takes place, not only inside of the aluminum (Al) particle. The state of the fast reaction taking place on and outside of respective particles is hereinafter called "particle stirring reaction" in this embodiment.

Hereinafter, each step is going to be described in detail. In the steps described below, explanation will be made when using, as the fluoride, sodium fluoride, and as the sodium borate, sodium metaborate ($NaBO_2$) that is separated as crystals.

[First Step]

At the first step (S-11), the aluminum powder 52 and the sodium fluoride (NaH) are uniformly mixed under an atmosphere of 10% or less of humidity; then, after having been rubbed so as to be adhered to each other, they are charged into a vessel under the atmosphere of 10% or less of humidity. After covered the vessel with a cap, this is put in a furnace, and heated at the temperature of 100° C. or higher and 330° C. or lower for 30 minutes or longer to cause aluminum (Al) and the sodium fluoride (NaF) to release the water thereby forming an aluminum oxide film on the particle surface of the aluminum (Al) powder 52.

Part of the sodium fluoride powder changes to hydrogen fluoride by the water vapor, and this then reacts with aluminum to form aluminum fluoride. After this heat treatment, the powder is cooled and then mixed with the sodium borate powder. At the first step, the aluminum and the fluoride are premixed; then, after the heat treatment, all the raw materials are mixed and charged into the tightly sealed vessel. Here, pre-mixing refers to the operation of mixing in advance the raw materials except for the sodium borate. The first step is carried out under the atmosphere of 10% or less of humidity so that attachment of the moisture in an air to the aluminum and to the fluoride as well as oxidation of the aluminum can be avoided. The treated powder is mixed with the sodium borate powder; and then, after the resulting mixture is charged into the tightly sealed vessel, inside of the sealed vessel is filled with a non-oxidative gas. The timing of filling the tightly sealed vessel with the non-oxidative gas may be after or before the raw materials are charged into the vessel.

At the first step (S-11), there is no particular restriction in the temperature of the inside of the tightly sealed vessel at the time when the raw materials are charged; here, the workability is good as far as the temperature is lower than 100° C.

In the production of the sodium borohydride, at the first step, aluminum is charged into the tightly sealed vessel such that the mole ratio of aluminum to boron in the sodium metaborate may become 4/3 or more. The addition amount of the aluminum powder is preferably 110% or more in terms of the mole ratio that is necessary for synthesis of the sodium borohydride. Part of the excess aluminum is consumed by the reaction with water; but this also contributes to the increase in the chance of the contact with the sodium metaborate when the amount of the raw material aluminum is decreased as the reaction progresses, so that the reaction yield may be increased. The aluminum excessively charged may be recovered as the aluminum metal at the extraction process of the sodium borohydride, so that this may be reused.

The tightly sealed vessel that can be used here is the vessel that has a heat resistance and a pressure resistance endurable to a high temperature (for example, 560° C.) and to a high pressure (for example, 10 MPa), and that can ensure the sealed space to fill a gas. The vessel that is equipped with a stirring means may be used as well. Details of the tightly sealed vessel like this will be described later.

[Second Step]

As illustrated in FIG. 1, at the second step (S-12), all the raw materials are mixed and charged into the tightly sealed vessel, and then, the inside of the tightly sealed vessel is heated at the temperature of 400° C. or higher and 560° C. or lower to degas the remaining water included in the sodium borate and the aluminum powder, and at the same time, the water that failed to be removed by degassing is caused to react with aluminum thereby changing to hydrogen gas and the aluminum oxide film so that the water may be removed. The aluminum fluoride ($AlF_3$) formed at the first step is converted by heating at a high temperature to the cryolite ($Na_3AlF_6$), which forms the NaAlF layer. At this step, the vaporized water, (namely the remaining water included in the raw materials in the tightly sealed vessel) is caused to react with aluminum, or the water is removed from the reaction system by degassing using a vacuum pump thereby causing the aluminum fluoride formed on the aluminum surface to form the cryolite. At this process, the cryolite ($Na_3AlF_6$) is formed from the aluminum fluoride ($AlF_3$) over about 30 minutes when the temperature is 530° C. The dehydration reaction is over within about 0.5 to about 1 hour by using, as the raw material, the dry sodium metaborate containing about 0 to about 3% of water.

[Third Step]

As illustrated in FIG. 1, in this embodiment, after the second step (S-12) described above is over, the third step (S-13) described below is arranged so that the sodium borohydride can be produced.

In this embodiment, in the reaction to produce the sodium borohydride, the powders are contacted to each other as they are in the solid phase state to cause the reaction on the surface of aluminum; then, the products and the raw materials migrate by diffusion thereby continuing the synthesis reaction. At this time, in order to help the mass transfer of these substances, a kinetic energy by stirring may be given.

As production of the sodium borohydride progresses, the amount of hydrogen in the reaction vessel decreases; so, by increasing the hydrogen gas pressure, the reaction rate can be increased. The reaction here can be expressed by the following reaction formula (2).

$$4Al+6H_2+3NaBO_2 \rightarrow 3NaBH_4+2Al_2O_3 \quad (2)$$

At the third step, the tightly sealed vessel used at the first step to the second step may also be used as it is, or a different tightly sealed vessel may be used. Namely, the process from the first step to the third step may be carried out as the process in a single tightly sealed vessel or as the process in different tightly sealed vessels.

The hydrogen gas pressure retained at the third step is preferably in the range of 0.5 MPa or more to 10 MPa or less, while more preferably in the range of 0.6 MPa or more to 1 MPa or less. By setting the hydrogen gas pressure in the range of 0.6 MPa or more to 1 MPa or less, not only the production efficiency of the sodium borohydride is excellent, but also the reaction vessel, the equipment, and the like do not require the pressure resistance, so that the increase in the equipment cost can be reduced.

At the third step, in order to satisfactorily carry out the reaction, the heating temperature is set preferably at 490° C. or higher and 560° C. or lower. By setting the heating temperature at 490° C. or higher and 560° C. or lower, a satisfactory reaction rate can be obtained. Therefore, not only the production efficiency of the sodium borohydride is excellent, but also sublimation of the resulting sodium borohydride can be suppressed; thus, a satisfactory yield can be obtained.

Here, the reaction temperature is set to 490° C. or higher so as to form the needle-like (rod-like) iota alumina and to make the product sodium borohydride (SBH) to a molten state thereby facilitating the reaction. Namely, even by the reaction below 490° C., the oxidized film of the aluminum (Al) can be converted to the iota alumina, but the formation speed of the iota alumina becomes so slow that what is called a long needle-like iota alumina, which is formed at 490° C. or higher, changes to a short rod-like iota alumina. Because the sodium borohydride (SBH) cannot become a molten body, the migration through the iota alumina layer is slowed down, so that the amount thereof that exudes together with the sodium hydride (NaH) to outside of the aluminum (Al) particle is significantly decreased. Accordingly, many of the formation reactions of the sodium borohydride (SBH) take place in the state where the boron ion having passed through the iota alumina layer react with the sodium hydride (NaH) inside of the aluminum (Al) particle; thus, the formation reaction is not fully facilitated.

Figure 10:
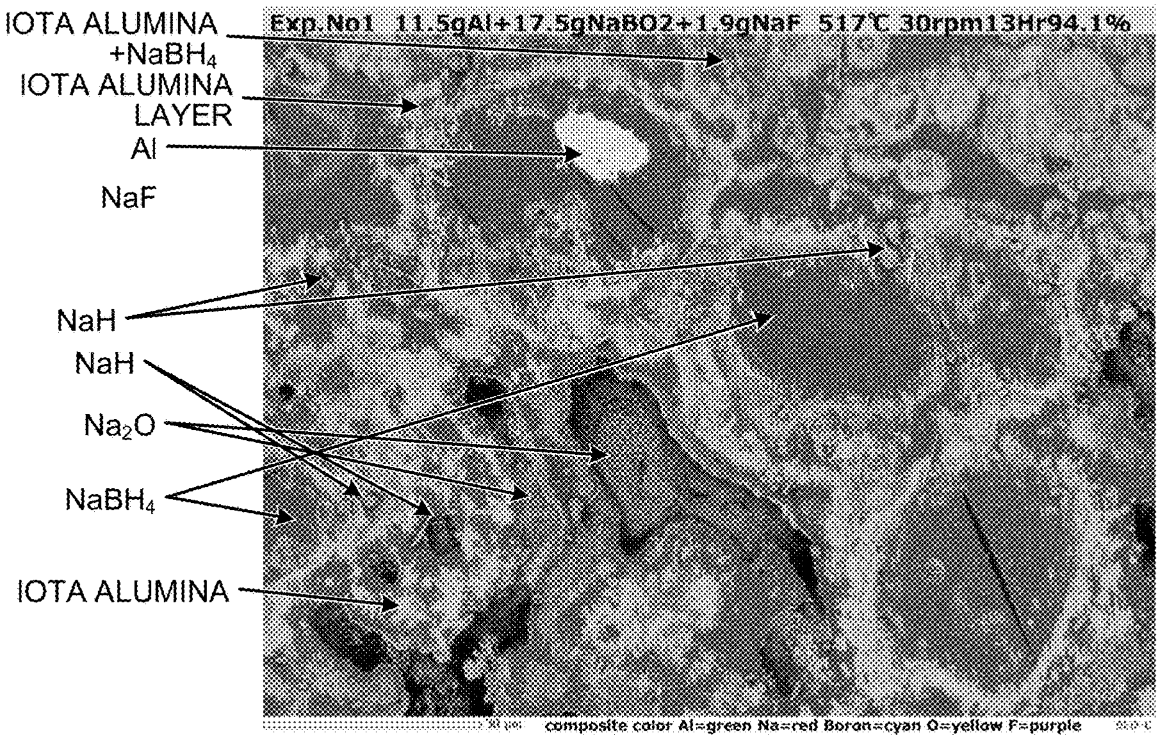
FIG. 10 is the SEM mapping image of the product obtained by the first pretreatment with the reaction temperature of 517° C.
Figure 11:
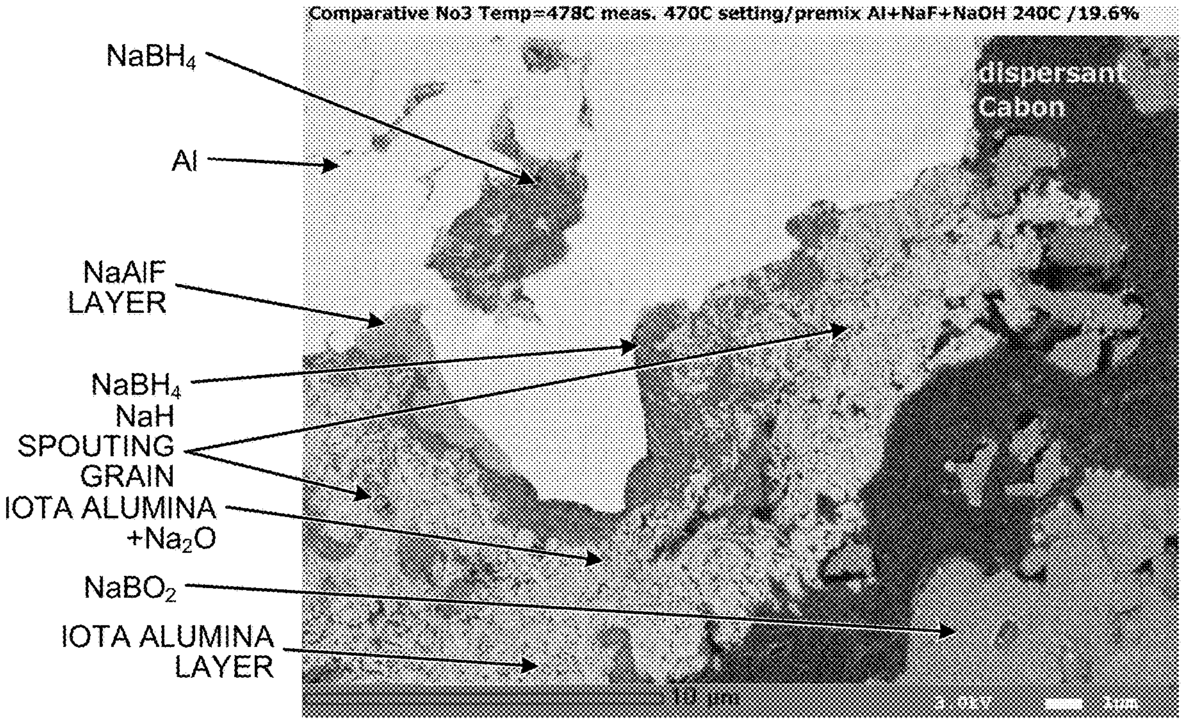
FIG. 11 is the SEM mapping image of the product obtained by the second pretreatment with the reaction temperature of 478° C.
Figure 12:
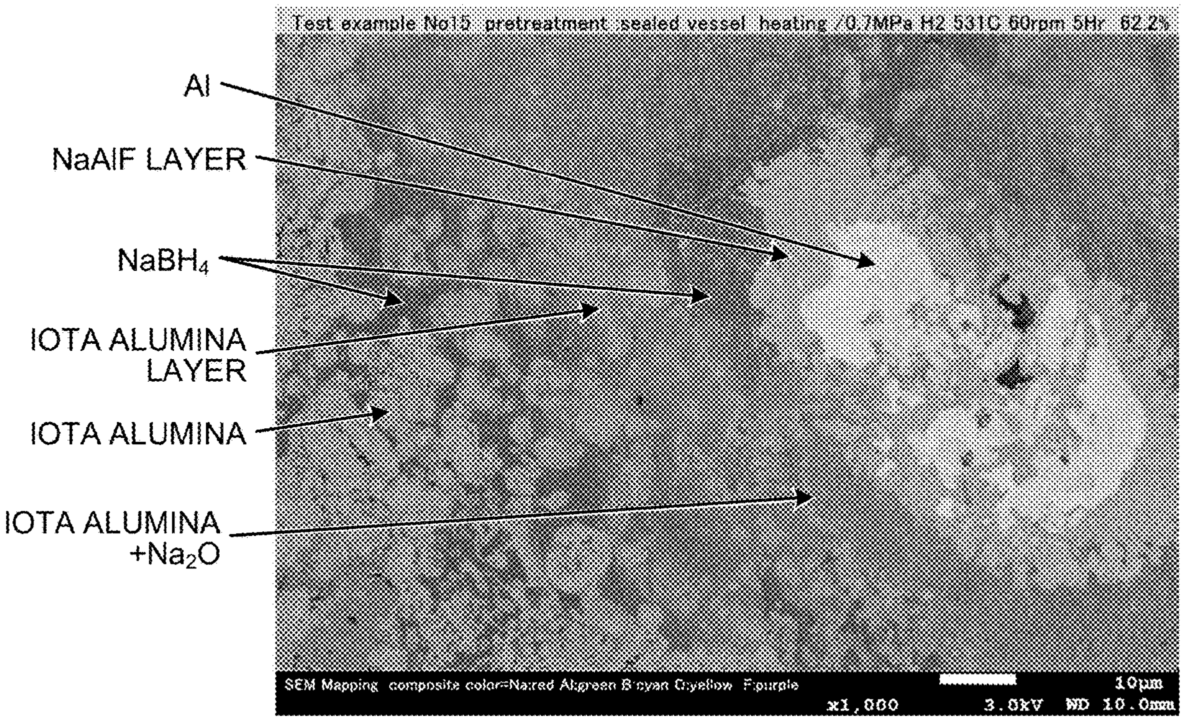
FIG. 12 is the SEM mapping image of the product obtained by the fourth pretreatment followed by heating under a tightly sealed condition with the reaction temperature of 530° C.

Here, the presence states of the needle-like alumina layer and of the sodium borohydride (SBH) at different reaction temperatures are compared in FIG. 10 to FIG. 12. FIG. 10 is the SEM backscattered electron image of the product with the reaction yield of 81.2% obtained by the method in which after aluminum (Al) and sodium fluoride (NaF) are mixed and stirred at 250° C. in an air for one hour for the first pretreatment, sodium metaborate ($NaBO_2$) is added thereto followed by heating with degassing by a vacuum pump; and then, with introducing the hydrogen gas, the reaction is carried out at the reaction temperature of 530° C. FIG. 11 is the SEM backscattered electron image of the product with the reaction yield of 19.7% obtained by the method in which after aluminum (Al), sodium hydroxide (NaOH), and sodium fluoride (NaF) are mixed and stirred at 240° C. for one hour for the second pretreatment, which is then followed by heating with degassing by a vacuum pump; and then, with introducing the hydrogen gas, the reaction is carried out at the reaction temperature of 478° C. FIG. 12 is the SEM backscattered electron image of the product with the reaction yield of 62.2% obtained by the method in which, as the fourth pretreatment, after the raw materials added with sodium hydroxide (NaOH) and sodium fluoride (NaF) as the additive, are degassed with a vacuum pump, which is followed by introducing a hydrogen gas and heating under the tightly sealed condition, the third step is stopped at 530° C. and 5 hours. As can be seen in FIG. 10, FIG. 11, and FIG. 12, the needle-like iota alumina layer is formed around the aluminum (Al) at the center. FIG. 12 shows a thick NaAlF layer formed around the aluminum. When the reaction temperature is higher than 490° C., the sodium borohydride (SBH) fills the gap in the iota alumina tissue of the iota alumina layer, as can be seen in FIG. 10 and FIG. 12. Here, the second and fourth pretreatments correspond to the first pretreatment in the first embodiment. Each of these pretreatment is going to be described in detail in the description of each embodiment.

On the other hand, as can be seen in FIG. 11, when the reaction temperature is 478° C., which is lower than 490° C., the product sodium borohydride (SBH) is solid, so that this cannot penetrate into the iota alumina tissue. Therefore, as can be seen in FIG. 11, because the gaps are formed in the iota alumina layer, it is difficult for the sodium borohydride that is formed near the aluminum surface to pass through the iota alumina layer; thus, the sodium borohydride (SBH) is present together as the solid between the iota alumina layer and the aluminum.

Accordingly, the reaction in the temperature range where the sodium borohydride (SBH) is solid is dependent on the solid diffusion of the products, the intermediates, and the sodium borate in the iota alumina layer; thus, the reaction rate is very slow.

In addition, because the migration of the sodium borohydride (SBH) to outside of the iota alumina layer is small, the sodium borohydride (SBH) cannot function as the adhesive agent nor as the medium for the migration of the sodium hydride (NaH).

As a result, although the reaction system is in the state of particle, this is not the particle stirring reaction in which the products, the intermediates, and the sodium borate undergo a very fast mass transfer. Therefore, it is presumed that because the reaction is dependent on the solid diffusion, the reaction rate and the reaction yield are decreased significantly.

Through the first step to the third step described above, the sodium borohydride (SBH) can be produced.

Next, the time until the start of the reaction (time lag) at the third step is going to be described.

At the third step, the time until the start of the reaction is called a time lag. To the total amount of the raw materials to be reacted, the sum of the sodium hydride (NaH) and the sodium borohydride (SBH), which is necessary at least to start the particle stirring reaction, is the hydrogen decreased amount of 2.5 to 3.5%, which corresponds to the amount of boron (B) in the raw material. The ratio of these hydrides can be measured by the hydrogen decreased amount.

The time lag described here is determined to be the time from the start of the stirring until the reaction yield reaches 3%. The measurement results of the relationship of the time lag with each of the Na/B ratio, the reaction temperature, and the pretreatment temperature are described in FIG. 16, FIG. 17, and FIG. 18, respectively.

Figure 17:
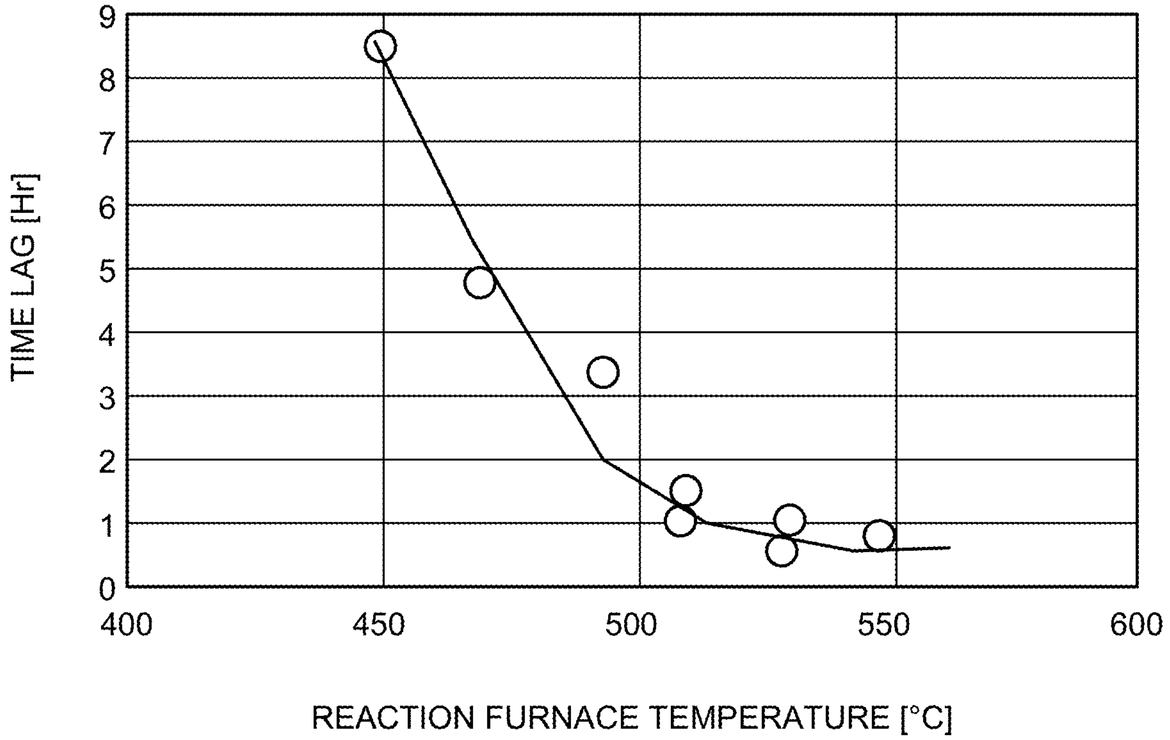
FIG. 17 is the graph illustrating the relationship between the heating temperature and the time lag.

In the relationship with the reaction temperature in FIG. 17, the particle stirring reaction does not take place at 490° C. or lower. Therefore, the time lag here (FIG. 17) is the period until the initial aluminum oxide film changes to the iota alumina layer so that the reaction rate becomes faster.

Figure 16:
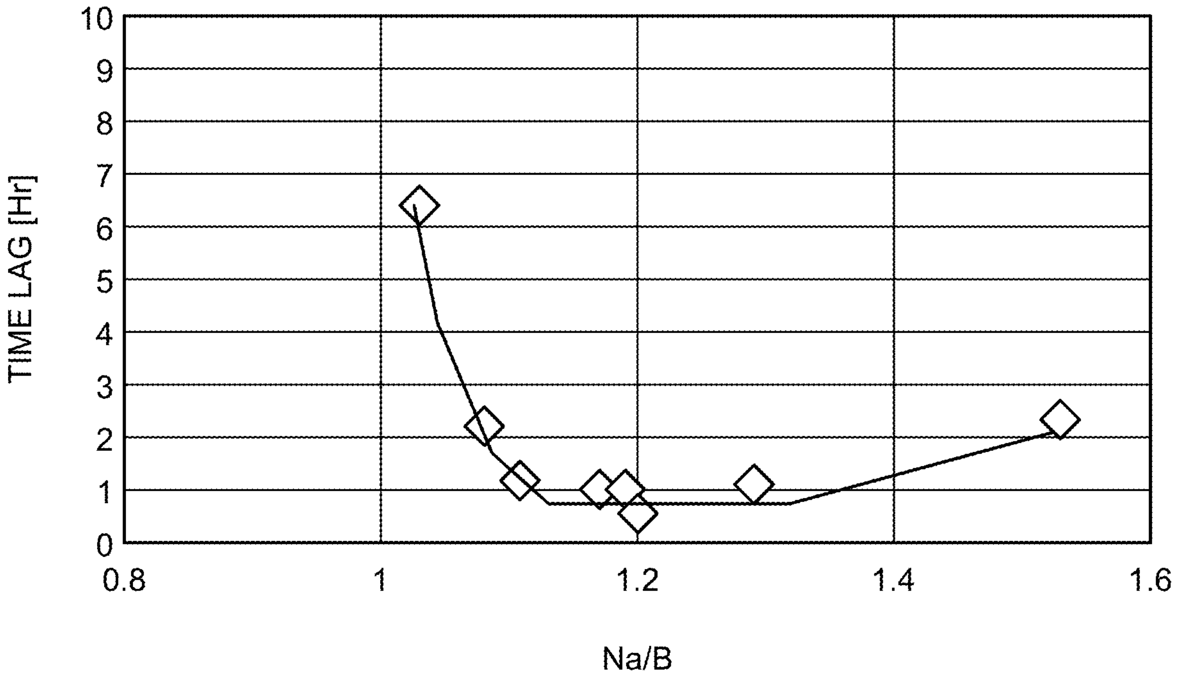
FIG. 16 is the graph illustrating the relationship between the Na/B ratio and the time lag.
Figure 18:
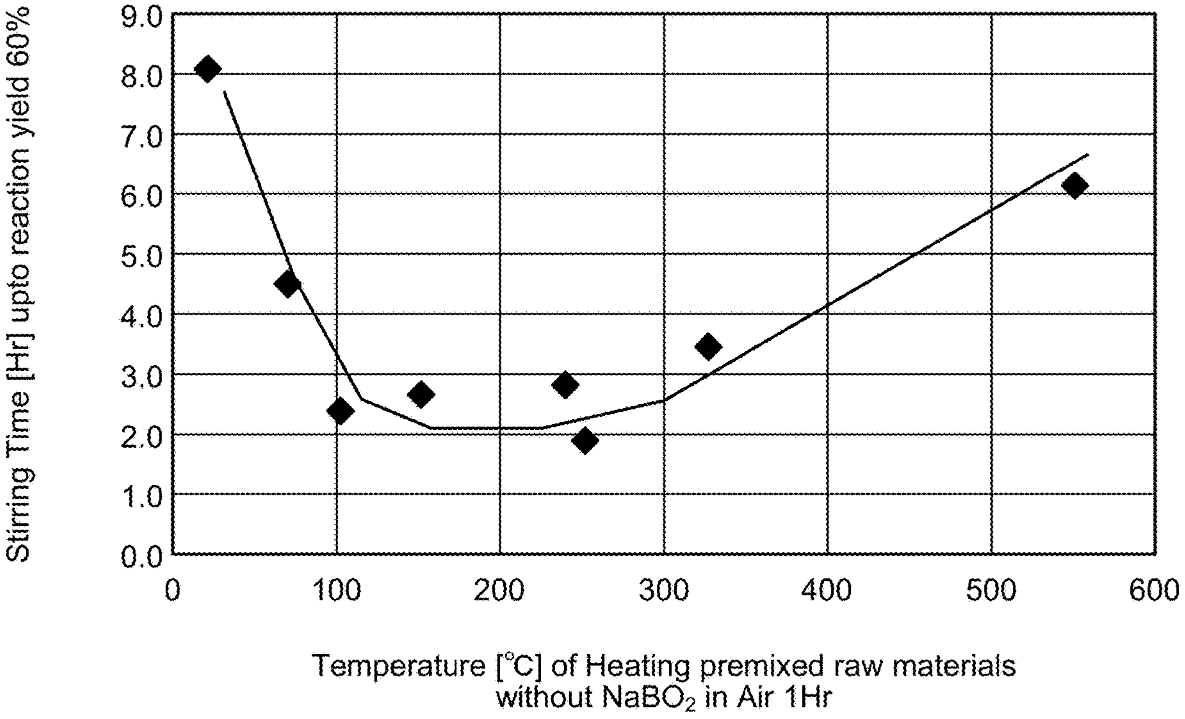
FIG. 18 is the graph illustrating the relationship between the premix burning temperature and the time when the reaction yield reaches 60%.
Figure 19:
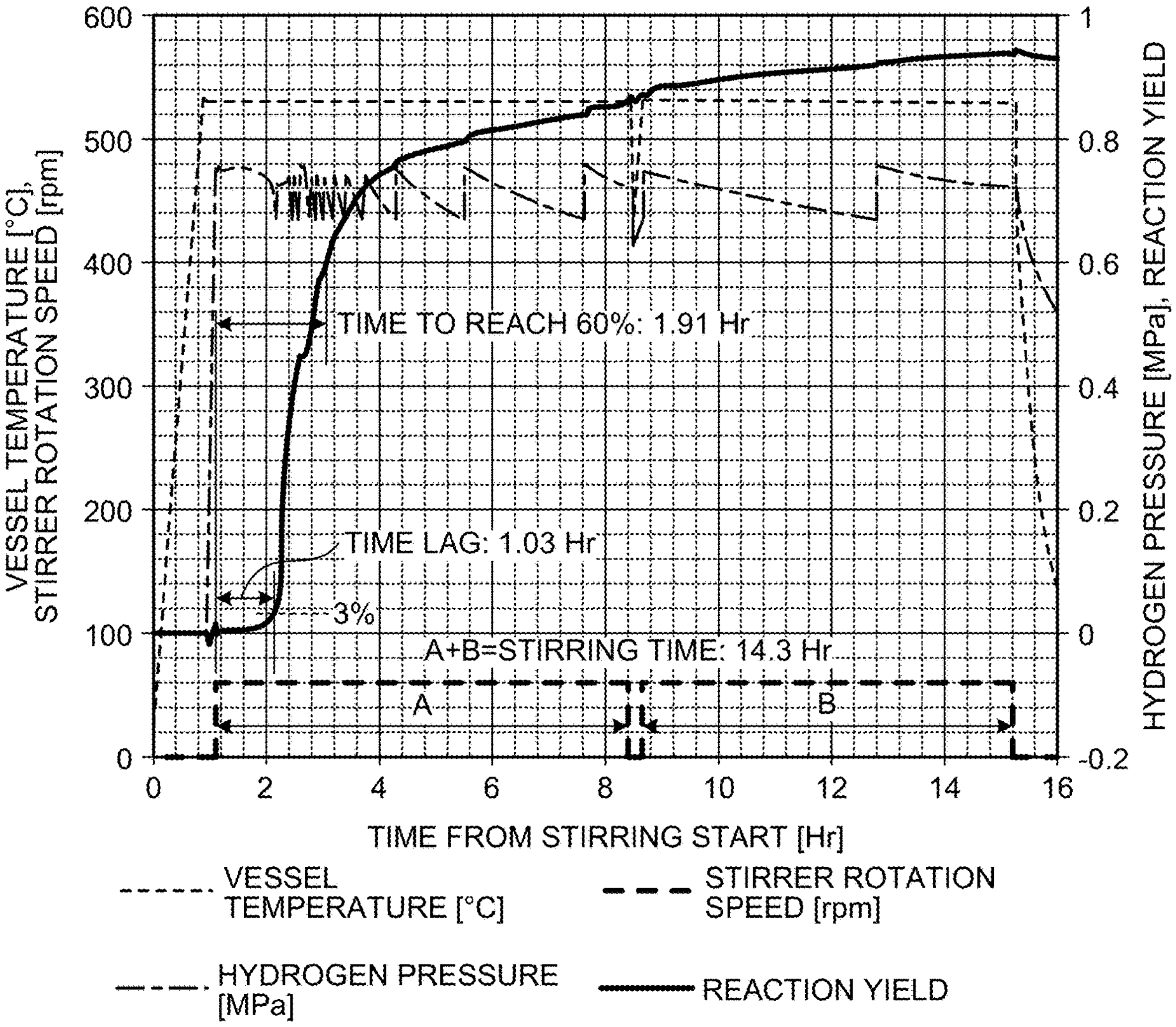
FIG. 19 is the graph illustrating the relationship between the stirring time and the SBH reaction yield in Test Example 8.

As can be seen in the time lag period in FIG. 19, the reaction rate from the start of the stirring to the start of the particle stirring reaction is very slow. This is because the initial aluminum oxide film ($Al_2O_3$) that is formed on the surface of the aluminum (Al) particle is the oxide film that is very hard barrier to the mass transfer (the thickness thereof is estimated to be from 5 nm to 10 nm). In order to cause the reaction, at least the sodium ion needs to migrate by diffusion through this oxide film. As can be seen in FIG. 16, when Na/B is greater than 1, this increases the sodium ion thereby decreasing the time lag. As can be seen in FIG. 17, the time lag is shorter at a higher temperature. As can be seen in FIG. 18, the time lag can be decreased by an appropriate pretreatment temperature. It is presumed that the reaction during this time lag period is a series of the reactions in which the sodium ion migrates by diffusion through the initial aluminum oxide film ($Al_2O_3$), then is reduced by aluminum and hydrogen at the aluminum interface to form sodium hydride (NaH), and then this sodium hydride (NaH) reacts with boric acid to form the sodium borohydride (SBH).

The aluminum oxide ($Al_2O_3$) that is formed by the aluminum's sodium oxide reducing action has a very high activity so that this immediately reacts with sodium oxide ($Na_2O$) to become sodium aluminum dioxide ($NaAlO_2$), which forms the needle-like iota alumina ($0.67Na \cdot 6Al \cdot 9.33O$) in the presence of the fluoride ion; then, this forms the iota alumina under the initial aluminum oxide film with releasing the sodium oxide ($Na_2O$), and changes to the iota alumina layer including the sodium oxide ($Na_2O$).

The sodium hydride (NaH) formed by the aluminum's sodium oxide reducing action reacts with boric acid to become the sodium borohydride (SBH). The sodium borohydride (SBH) is in the molten state at 490° C. or higher, thereby dissolving the sodium hydride, a small amount of the sodium oxide, the aluminum ion, the fluoride ion, the oxygen ion, and the metaborate ion ($BO_2^-$), so that this functions as the mass transfer medium and the reaction field. This allows each ion to move in and out of the oxide layer on the outside of the aluminum particles, allowing the reaction to proceed and the iota alumina layer to grow. In addition, the sodium borohydride (SBH) that exudes to the outside of the iota alumina layer plays a role as an adhesive agent. With this, because of the contact of the aluminum particle with the sodium borate particle by stirring, the sodium borohydride (SBH) having the sodium hydride (NaH) dissolved therein migrates from the aluminum particle to the sodium borate particle, and the sodium borate and the sodium oxide ($Na_2O$) can move from the sodium borate particle to the aluminum particle.

It was found that when the reaction yield in terms of the hydrogen decreased amount reaches about 3%, the ratio of the aluminum (Al) particle having on the surface thereof the sodium borohydride (SBH) that became the medium increases, thereby allowing the intermediates and raw materials movable to cause the chain reaction in which the very fast "particle stirring reaction" proceeds.

In the later stage of the reaction at the third step, the reaction product may be taken to outside once, then, this may be crushed with a hammer mill having a sieve or the like, or by the dropping operation of the blade or the like in the tightly sealed vessel (hereinafter, crushing treatment). When the reaction product is crushed in the later stage of the reaction, the particle-like products having been adhered together separate, so that the contacting chance of the aluminum (Al) particle with the raw material sodium borate (sodium metaborate ($NaBO_2$)) increases in the course of reaction, thereby enabling to enhance the reaction rate.

When the reaction yield becomes higher, the concentration of the sodium borohydride in the reaction system becomes higher to cause adhesion of the particles to each other, resulting in formation of the agglomerated particles having a plurality of the particles adhered together. When the size of the agglomerated particles becomes larger, the reaction rate becomes slower. This decrease in the reaction rate is the result of the reduced surface area of the reaction field, or the longer migration distance required for the reaction of substances moving from the aluminum particles through the iota alumina layer and for the reaction of the substances moving from the sodium metaborate ($NaBO_2$) 102. Here, the substances that move from the aluminum particle are the sodium borohydride, the sodium hydride, the sodium oxide, the sodium ion (Nat), and the aluminum ion ($Al^{3+}$), and the substances that move from the sodium metaborate ($NaBO_2$) 102 are the metaborate ion ($BO_2^-$) and the oxygen ion ($O^{2-}$).

Here, by crushing the agglomerated particle products, the reaction rate may be increased because the surface area is increased, the diffusive migration distance is shortened, and the particle stirring reaction is resumed by the contact migration. With this, the decrease in the formation speed of the sodium borohydride (SBH) can be suppressed.

Next, the process to form the sodium borohydride (SBH) using the sodium fluoride (NaF) as the fluoride will be described in detail with referring to the schematic drawings of the reaction (FIG. 5A to FIG. 5F), which simulate the formation of the sodium borohydride. FIG. 5A to FIG. 5F are the schematic drawings that simulate the formation reaction (the second step to the third step) of the sodium borohydride (SBH).

Here, the fluoride (for example sodium fluoride: NaF) is added in order to increase the reaction yield of the sodium borohydride, as described above. The fluoride has two actions to aluminum. The first action is to facilitate crystallization of alumina, and the second action is to form the NaAlF layer on the aluminum surface to produce the strong reducing substance so as to assist formation of the sodium hydride (NaH).

Even a fluoride other than sodium fluoride has the same action because this becomes the fluoride ion thereby finally forming the NaAlF layer mainly composed of the stable cryolite.

1) Aluminum Surface Reforming Step by Water Removal (Second Step)

Figure 5A:
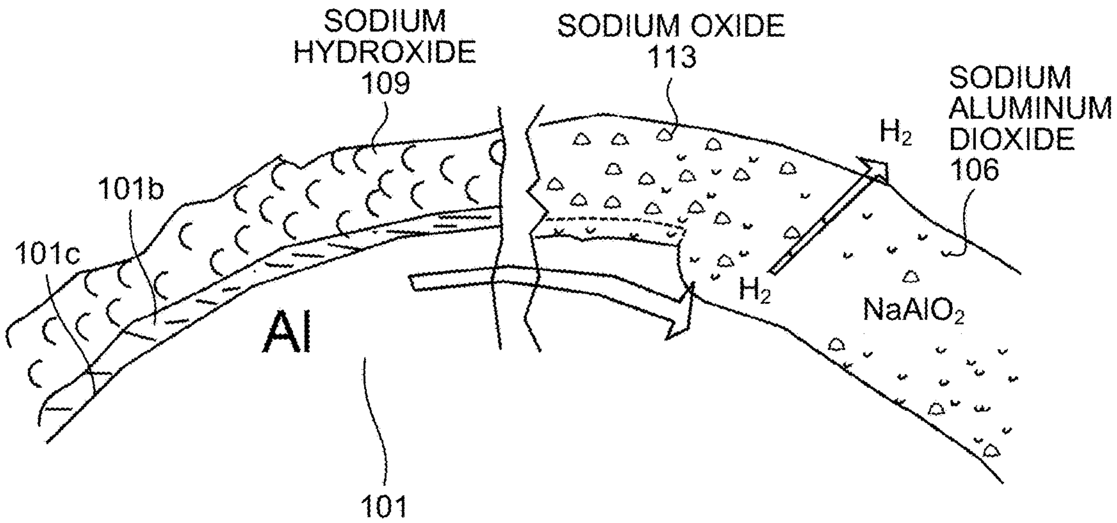
FIG. 5A is the reaction scheme illustrating the process of the sodium borohydride (SBH) formation reaction.

As illustrated in FIG. 5A, after the first step is over, the process moves to the second step. At the second step, the water that remains in the added sodium hydroxide (NaOH), the sodium borate, and the aluminum oxide film is removed to form the sodium oxide from the sodium hydroxide, which is then caused to react with aluminum to form sodium aluminum dioxide ($NaAlO_2$). At the second step, also, the water formed in the reaction vessel under the tightly sealed condition is caused to react with the fluoride to generate hydrogen fluoride, which is then caused to react with aluminum to form the NaAlF layer mainly composed of cryolite ($Na_3AlF_6$) on the aluminum surface.

2) Reaction Initial Period-1

Figure 5B:
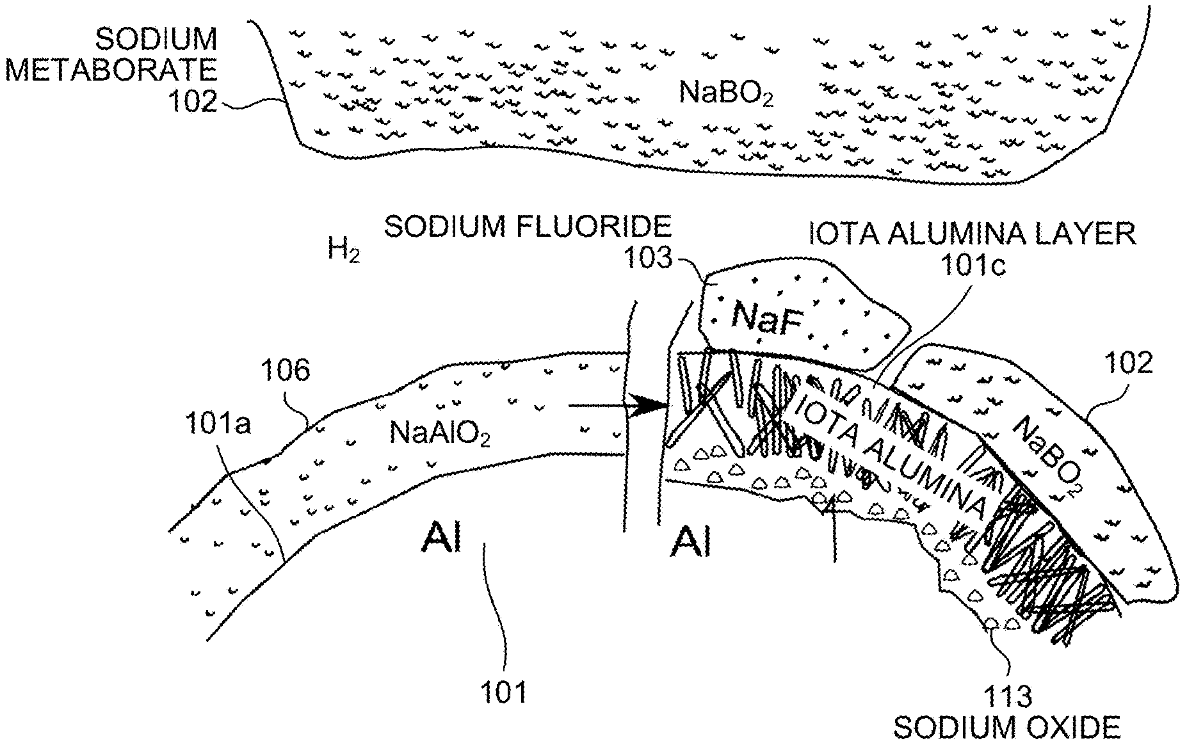
FIG. 5B is the reaction scheme illustrating the process of the sodium borohydride (SBH) formation reaction.

As illustrated in FIG. 5B, after the pretreatment step (second step) is over, the process moves to the third step. Here, the temperature is set at the prescribed reaction temperature (490° C. or higher and 560° C. or lower), then stirring is started. As illustrated in FIG. 5B, the sodium aluminum dioxide ($NaAlO_2$) 106 formed on a surface 101*a* of the aluminum (Al) particle 101 is changed to the needle-like iota alumina (0.67Na·6Al·9.33O) layer 101*c* by the crystallization facilitating action of the sodium fluoride (NaF) 103 and to the sodium oxide ($Na_2O$). Here, the reaction period from the initial aluminum oxide film to the iota alumina layer is the time lag.

3) Reaction Initial Period-2

Figure 5C:
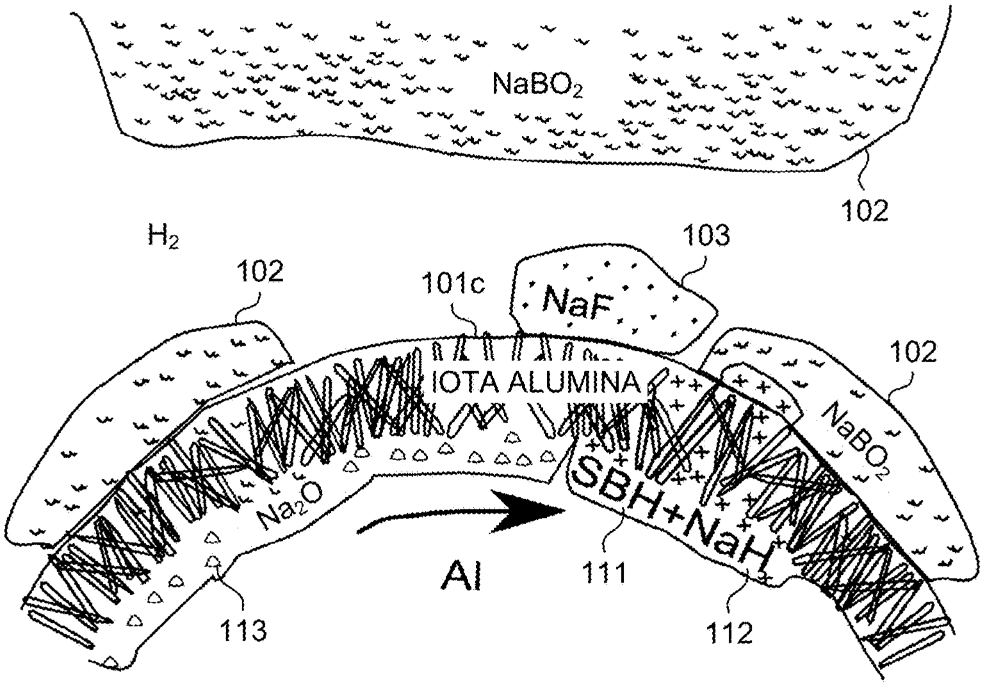
FIG. 5C is the reaction scheme illustrating the process of the sodium borohydride (SBH) formation reaction.

As illustrated in FIG. 5C, in the needle-like iota alumina layer 101*c*, mainly the hydrogen gas ($H_2$) in the atmosphere and the sodium ion ($Na^+$) of the sodium metaborate migrates, and also other ions migrate through the needle-like crystals of the iota alumina to reach inside of the iota alumina layer. Due to the presence of sodium oxide ($Na_2O$) formed in reaction initial period-1, and of the hydrogen gas, the sodium ion, the borate ion, the oxygen ion, and the fluoride ion that have migrated through the iota alumina layer, the reaction in which the sodium oxide ($Na_2O$) is continuously reduced by the aluminum starts inside the needle-like iota alumina layer 101*c*. This reaction produces sodium hydride (NaH) 112 and aluminum oxide ($Al_2O_3$); and this aluminum oxide immediately changes to the sodium aluminum dioxide ($NaAlO_2$). By the catalytic action of the fluoride ion, the sodium aluminum dioxide ($NaAlO_2$) is decomposed to the iota alumina 101*c* and the sodium oxide ($Na_2O$) 113.

The sodium hydride (NaH) reacts with boric acid ($B_2O_3$) to form the sodium borohydride ($NaBH_4$: SBH) 111 and the sodium oxide ($Na_2O$).

The molten sodium borohydride ($NaBH_4$), together with the sodium hydride (NaH) 112, exudes to outside of the needle-like iota alumina layer 101*c*. Then, the sodium borohydride ($NaBH_4$) mainly including the sodium hydride (NaH) from the iota alumina (0.67Na·6Al·9.33O) layer 101*c* migrates to the outside thereof.

4) Reaction Middle Period

Figure 5D:
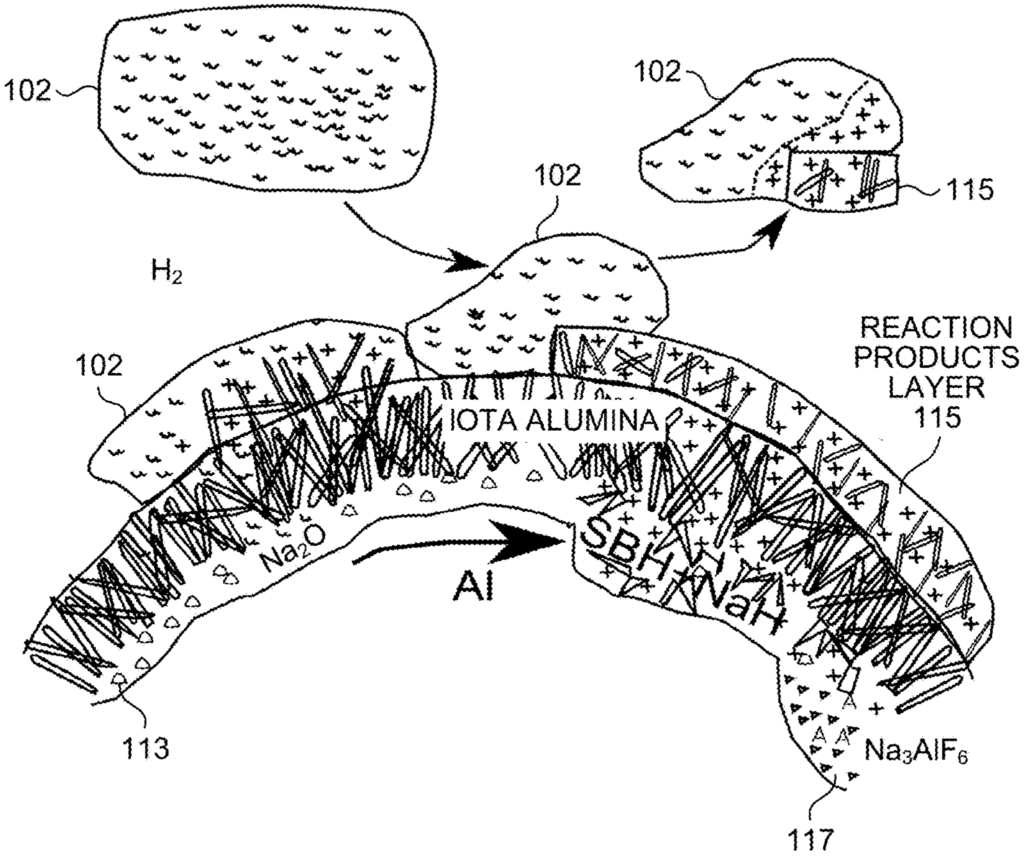
FIG. 5D is the reaction scheme illustrating the process of the sodium borohydride (SBH) formation reaction.

As illustrated in FIG. 5D, by the particle stirring reaction, mainly the sodium hydride (NaH), the aluminum ion ($Al^{3+}$), the metaborate ion ($BO_2^-$) from the sodium metaborate ($NaBO_2$) 102, the oxygen ion ($O^{2-}$), and the sodium ion ($Na^+$) each migrate from the inside of the aluminum particle through the needle-like iota alumina layer 101*c* that is filled with the sodium borohydride ($NaBH_4$) liquid that includes the products; then, the reaction starts inside and outside of the needle-like iota alumina layer 101*c*. In the reaction in the sodium metaborate particles, the sodium borohydride ($NaBH_4$) that includes the sodium hydride (NaH) reacts with the boric acid ($B_2O_3$) to form the sodium borohydride ($NaBH_4$) and the sodium oxide ($Na_2O$). At this time, the sodium oxide ($Na_2O$) contacts again with the aluminum particle by stirring; and thus, this becomes a circulation reaction.

5) Reaction Peak Period

Figure 5E:
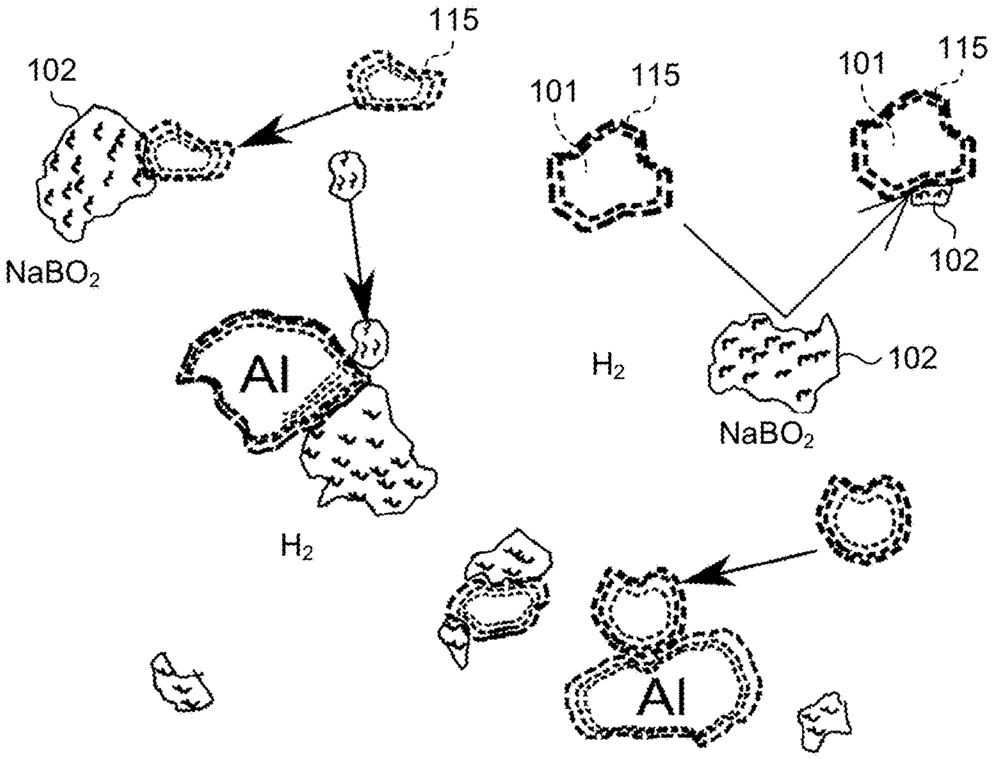
FIG. 5E is the reaction scheme illustrating the process of the sodium borohydride (SBH) formation reaction.

As illustrated in FIG. 5E, the particle stirring reaction takes place by exchanging the substances on the aluminum particle surface and on the sodium metaborate surface to each other by stirring. By repeating the particle-to-particle contact, the sodium metaborate ($NaBO_2$) 102 and the reaction product sodium oxide ($Na_2O$) are supplied to the aluminum particle 101 from the sodium metaborate particle 102. On the other hand, the reaction products (sodium borohydride (SBH) 111 and sodium hydride (NaH) 112) are supplied to the sodium metaborate ($NaBO_2$) particle 102 from the aluminum particle 101. Due to the particle stirring, the rapid exchange of these substances takes place thereby facilitating the particle stirring reaction, so that the aluminum particle gradually grows with incorporating the broken pieces of the sodium metaborate. On the other hand, also the sodium metaborate particle incorporates the sodium hydride, thereby changing to the sodium borohydride (SBH) and to the sodium oxide.

6) Termination of Reaction

Figure 5F:
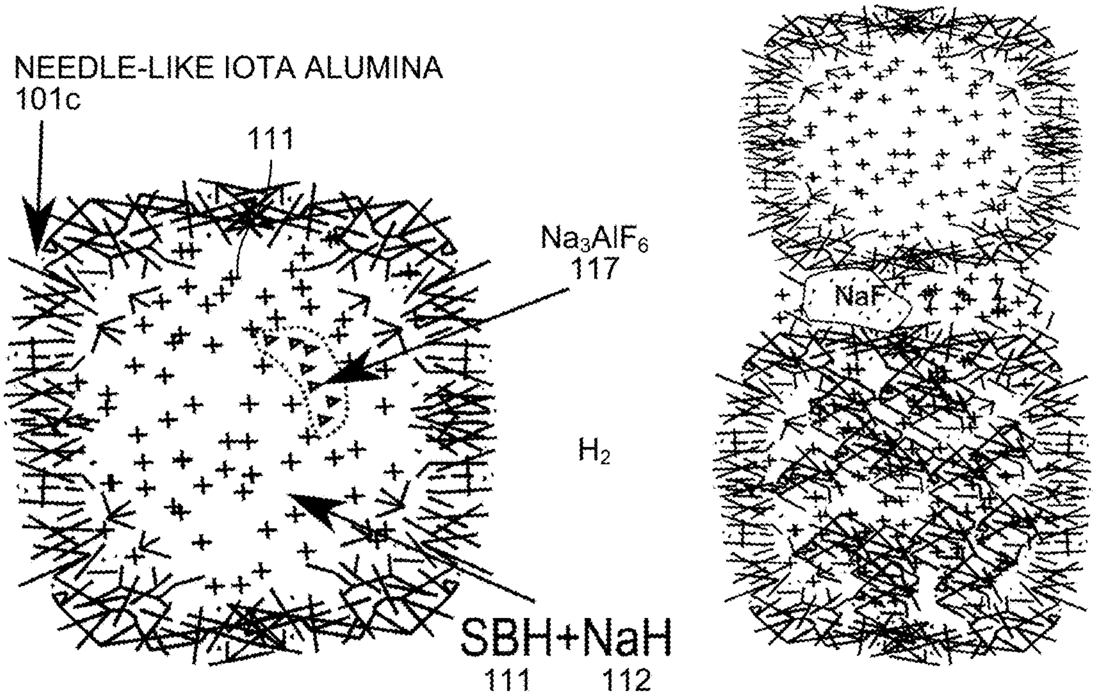
FIG. 5F is the reaction scheme illustrating the process of the sodium borohydride (SBH) formation reaction.

As illustrated in FIG. 5F, at the later stage of the reaction, the aluminum, the sodium oxide ($Na_2O$), and the boric acid ($B_2O_3$), which are the raw materials, are consumed, and the particle is changed to the product sodium borohydride (SBH) and the iota alumina.

The reaction rate in the latter half of the reaction decreases as the reduction reaction of sodium oxide ($Na_2O$) with hydrogen ($H_2$) and aluminum (Al) approaches equilibrium due to the decrease in the sodium borate ($NaBO_2$) concentration of the raw material.

On the other hand, the reducing substance (lower aluminum fluoride=AlF1.5 estimated) 117 is continue to form at the interface between aluminum (Al) and the NaAlF layer mainly composed of sodium hexafluoroaluminate (Na3AlF6) regardless of the sodium oxide concentration. Because the lower fluorinated aluminum can sublime and migrate, this reduces the sodium oxide to form the sodium hydride (NaH) 112, thereby increasing the reaction yield of the sodium borohydride (SBH) in the later stage of the reaction. As a result, the aluminum (Al) particle 101 and the sodium metaborate particle become the sodium borohydride (SBH) 111, and the needle-like iota alumina layer 101*c*, which are the reaction products.

Next, an example of the tightly sealed vessel that can be used in this embodiment will be described, but this embodiment is not limited to those described below.

Figure 6:
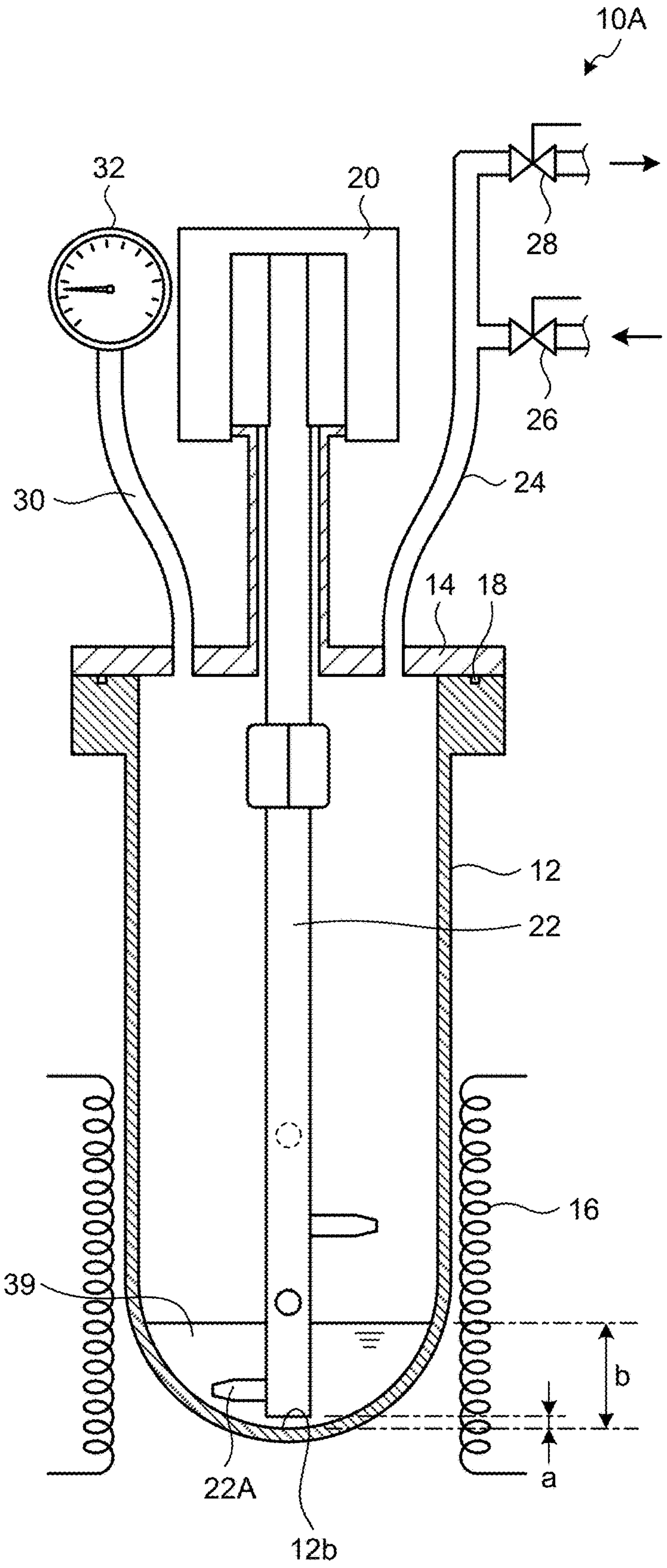
FIG. 6 is the partial sectional view illustrating one example of the tightly sealed vessel used in this embodiment.

FIG. 6 is a partial sectional view that illustrates one example of the tightly sealed vessel to be used in this embodiment.

As illustrated in FIG. 6, a tightly sealed vessel 10A has a vessel main body 12 having a round cylindrical bottom, and a disk-like detachable cap 14 that tightly seals the vessel main body 12. In the lower outside of the vessel main body 12, a temperature-controllable heater 16 is arranged so that the contents in the vessel main body 12 may be heated by the heater 16. In the upper end plane of the vessel main body 12, an O-ring 18 is arranged to ensure the air tightness of the inside of the vessel by tightly contacting to the cap 14. When the cap 14 is closed, the cap 14 is in the state of tightly contacted to the vessel main body 12 by means of the O-ring 18.

The cap 14 has an opening in the center thereof, and a cylindrical portion is vertically arranged near to the opening, and a motor 20 is arranged on the upper side of the cylindrical portion. The stirring equipment is provided with the motor 20, a stirring rod 22 that is connected to a rotation axis of the motor 20, and a plurality of pin-like stirrers 22A that are arranged in a perpendicular direction to the axis of the stirring rod 22. When the cap 14 is attached to the vessel main body 12, the front end of the stirring rod 22 reaches a lower region of the inside of the vessel main body 12. Namely, when the motor 20 is driven, the pin-like stirrer 22A rotates with the stirring rod 22 so that contents in the vessel main body 12 are stirred.

The cap 14 is further equipped with a first pipe 24 and a second pipe 30 that communicate with the inside of the vessel main body 12. The first pipe 24 is connected to a hydrogen gas supplying source (not illustrated in the drawing) via a hydrogen gas supplying valve 26, and to a vacuum pump (not illustrated in the drawing) via a gas discharging valve 28. Namely, when the hydrogen gas supplying valve 26 is made to be in an opened state, the hydrogen gas is supplied into the vessel main body 12, and when the gas discharging valve 28 is made to be in an opened state, inside of the vessel main body 12 is degassed. The second pipe 30 is connected to a pressure gauge 32 so that the pressure of inside the vessel main body 12 can be known by the pressure gauge 32.

Figure 7:
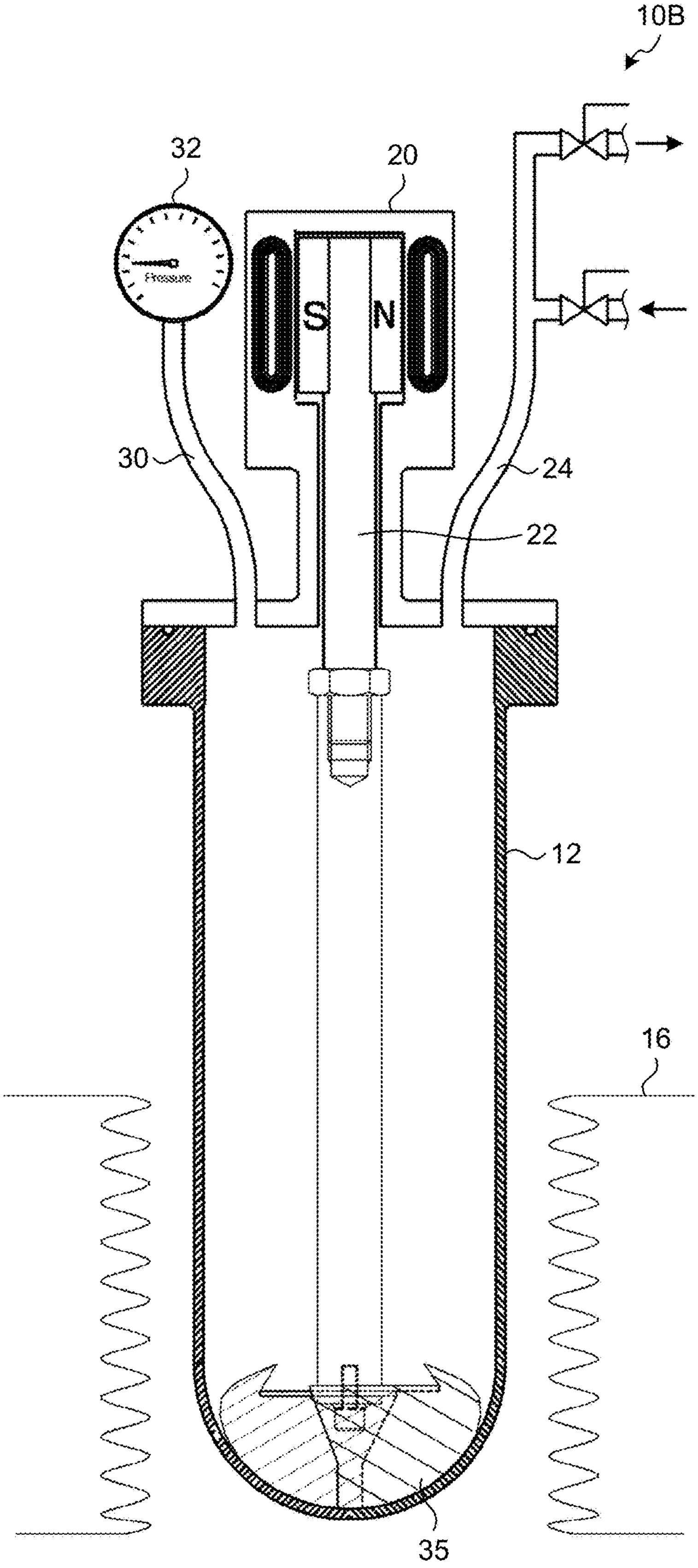
FIG. 7 is the partial sectional view illustrating another example of the tightly sealed vessel used in this embodiment.

FIG. 7 is a partial sectional view illustrating another example of the tightly sealed vessel used in this embodiment. The difference from the tightly sealed vessel 10A of FIG. 6 resides in that a tightly sealed vessel 10B has a plurality of blade-like scrapers 35 so as to form the multi-blades scraper (MB) in the lower end portion of the stirring rod 22 that rotates inside of the vessel main body 12.

Figure 13A:
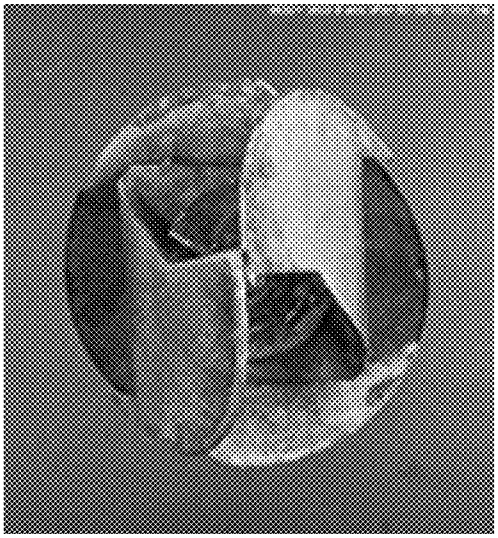
FIG. 13A is the photo of the front appearance of the stirrer having a blade-like stirrer using a tightly sealed vessel 10B that is illustrated in FIG. 7.
Figure 13B:
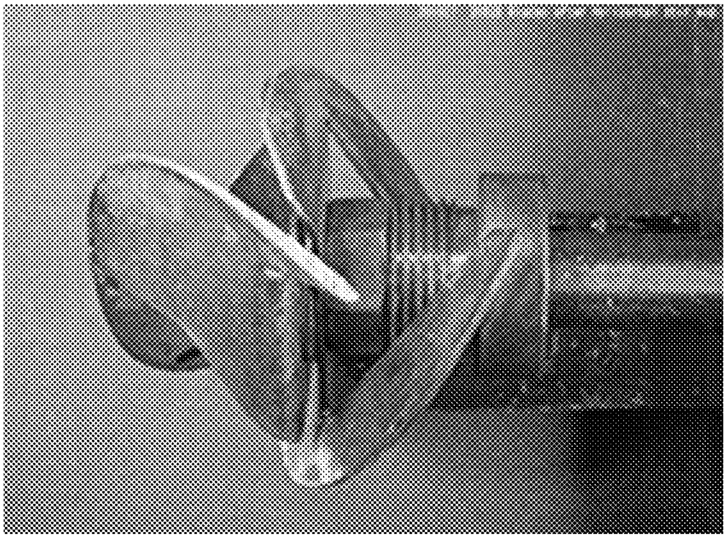
FIG. 13B is the photo of the side appearance of the stirrer having a blade-like stirrer using the tightly sealed vessel 10B that is illustrated in FIG. 7.
Figure 15A:
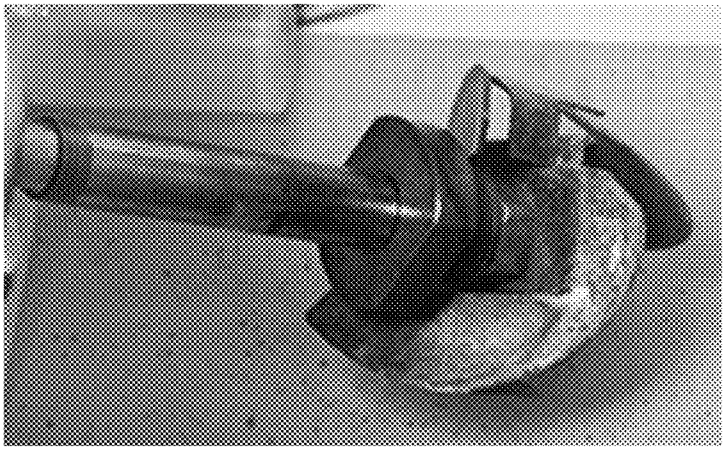
FIG. 15A is the photo of the blade-like stirrer in which the tightly sealed vessel illustrated in FIG. 7 is used and sodium borohydride is taken out from the vessel after completion of stirring for a prescribed period of time.
Figure 15B:
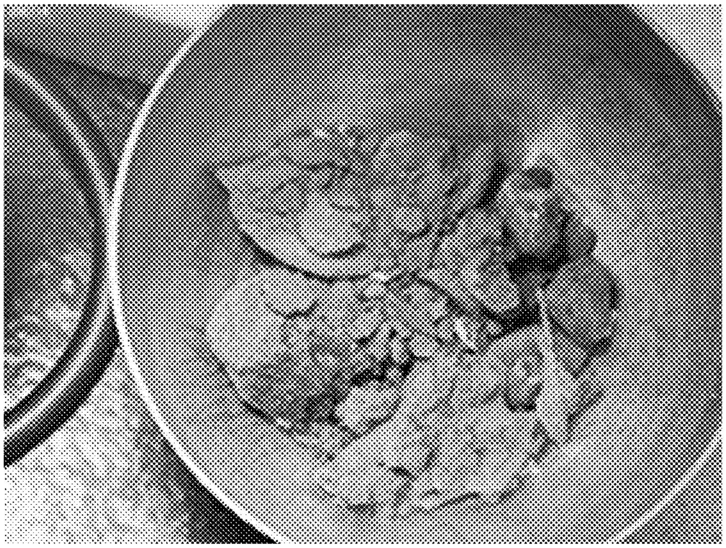
FIG. 15B is the photo of the product in which the tightly sealed vessel illustrated in FIG. 7 is used and sodium borohydride is taken out from the vessel after completion of stirring for a prescribed period of time.

FIG. 13A is the photo of the front appearance of the stirrer having the blade-like stirrer using the tightly sealed vessel 10B that is illustrated in FIG. 7. FIG. 13B is the photo of the side appearance of the stirrer having the blade-like stirrer using the tightly sealed vessel 10B that is illustrated in FIG. 7. FIG. 15A is the photo of the blade-like stirrer that is taken when the tightly sealed vessel illustrated in FIG. 7 is used and the sodium borohydride is taken out from the vessel after completion of stirring for a prescribed period of time. FIG. 15B is the photo of the product that is taken when the tightly sealed vessel illustrated in FIG. 7 is used and the sodium borohydride is taken out from the vessel after completion of stirring for a prescribed period of time. As can be seen in FIG. 15A, a ball-like product on the blade and the attached layer to the vessel's wall are recognized.

Figure 8:
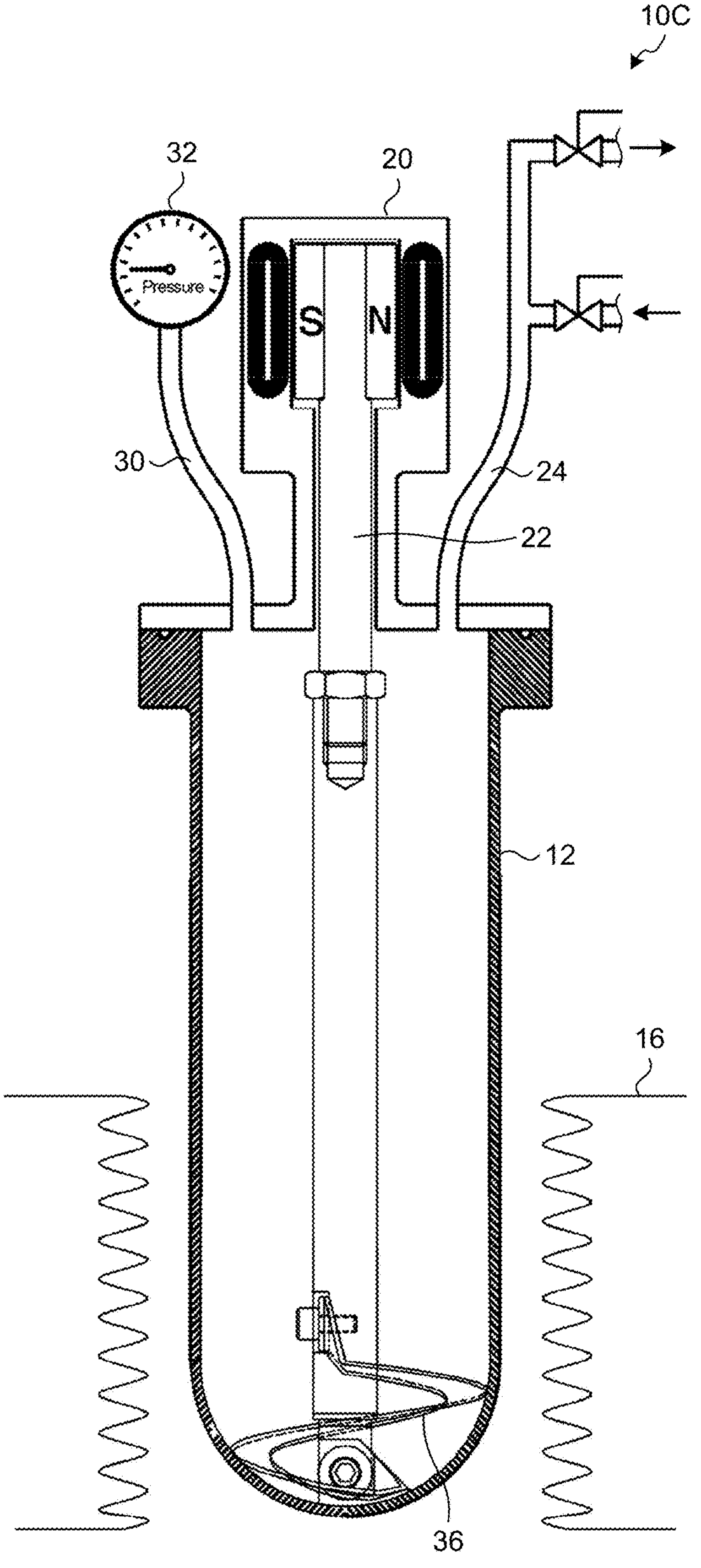
FIG. 8 is the partial sectional view illustrating another example of the tightly sealed vessel used in this embodiment.

FIG. 8 is a partial sectional view illustrating another example of the tightly sealed vessel used in this embodiment. The difference from the tightly sealed vessel 10A of FIG. 6 resides in that a tightly sealed vessel 10C has a ribbon-like scraper 36 in the lower end portion of the stirring rod 22 that rotates inside of the vessel main body 12.

Figure 9:
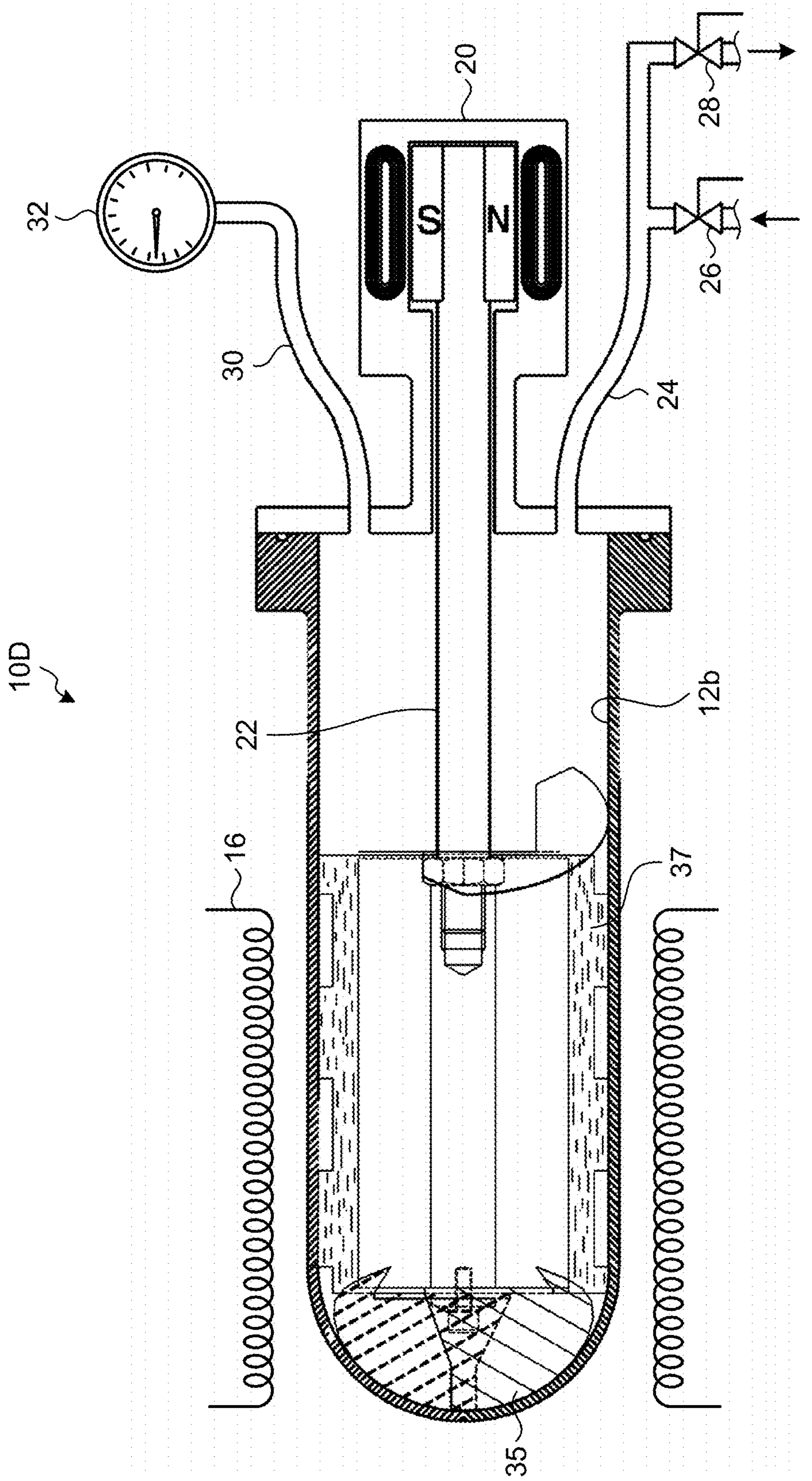
FIG. 9 is the partial sectional view illustrating another example of the tightly sealed vessel used in this embodiment.

FIG. 9 is a partial sectional view illustrating another example of the tightly sealed vessel used in the present embodiment. The difference from the tightly sealed vessel 10A of FIG. 6 resides in that in a tightly sealed vessel 10D, the vessel main body 12 is placed horizontally, and a wide puddle stirrer 37 is arranged to the stirring rod 22, which rotates inside of a vessel main body 12*b*, via the supporting portion thereof. In the case that the wide puddle stirrer 37 like the one in the tightly sealed vessel 10D is used for stirring, when the wide puddle stirrer 37 rotates, the raw material is scooped up by the puddle surface. During the time when the raw materials are scooped up by this puddle surface, or during the time when the raw materials thus scooped up are dropped, the particles of the raw materials collide to each other, so that the particle stirring reaction can smoothly take place.

Figure 14A:
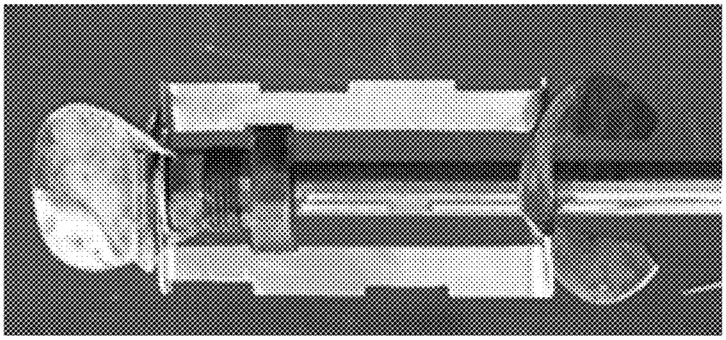
FIG. 14A is the photo that is taken before sodium borohydride is produced by rotating a horizontal type stirrer having the wide paddle (WP) in the tightly sealed vessel that is illustrated in FIG. 9.
Figure 14B:
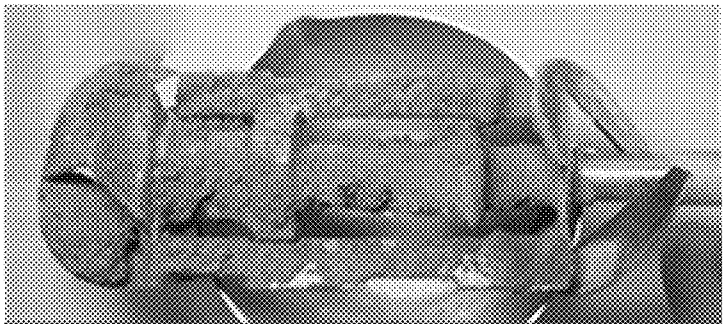
FIG. 14B is the photo that is taken after sodium borohydride is produced by rotating the horizontal type stirrer having the wide paddle (WP) in the tightly sealed vessel that is illustrated in FIG. 9.

FIG. 14A is the photo that is taken before the sodium borohydride is produced by rotating the horizontal type stirrer having the wide paddle (WP) stirrer in the tightly sealed vessel that is illustrated in FIG. 9. FIG. 14B is the photo that is taken after the sodium borohydride is produced by rotating the horizontal type wide paddle (WP) stirrer in the tightly sealed vessel that is illustrated in FIG. 9.

Second Embodiment

Figure 2:
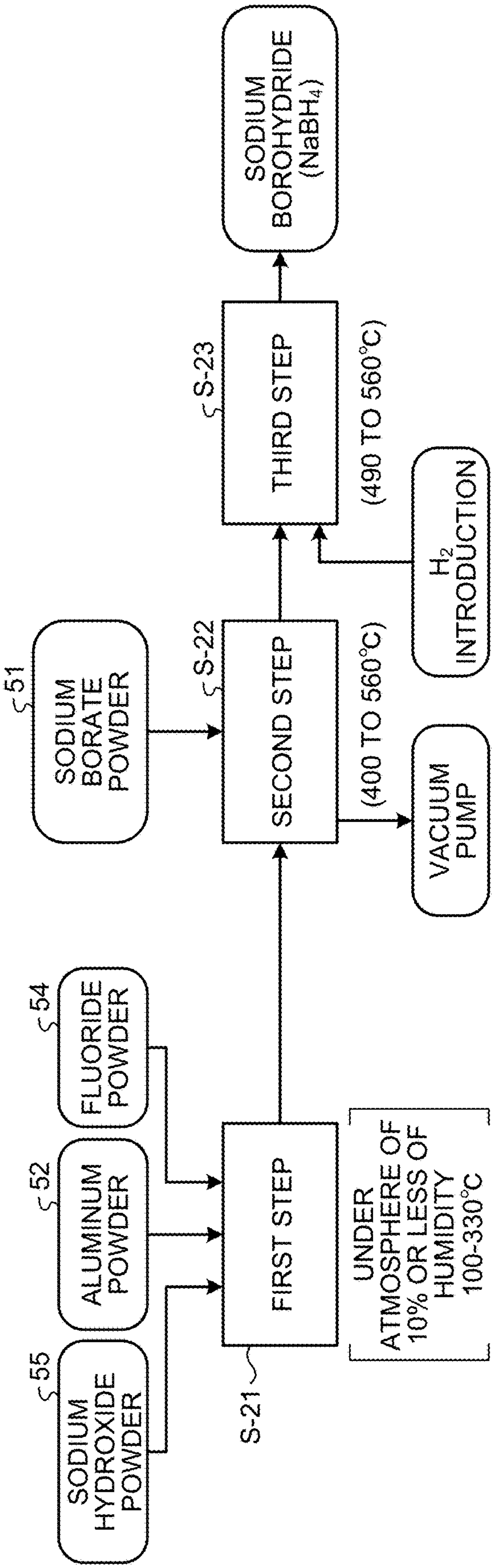
FIG. 2 is the process chart to produce sodium borohydride (SBH) according to the second embodiment in which a sodium borate is used as a raw material.

FIG. 2 is the process chart to produce the sodium borohydride (SBH) according to the second embodiment in which the sodium borate is used as the raw material. In the production method of the sodium borohydride according to the second embodiment, after the aluminum powder 52, the sodium hydroxide powder 55, and the fluoride powder 54 are mixed and are previously heated at the temperature of 100° C. or higher and 330° C. or lower, this is further mixed with the sodium borate powder 51; then, after the resulting mixture is charged into the tightly sealed vessel, the water therein is removed by using a vacuum pump with heating at 400° C. or higher and 560° C. or lower, followed by introducing the hydrogen gas; then, the reaction is carried out in the tightly sealed vessel that is filled with the hydrogen gas at the temperature of 490° C. or higher and 560° C. or lower. Both the sodium borate powder 51 and the aluminum powder 52 react as they are in the solid phase state. The production method of the sodium borohydride according to the second embodiment includes, as illustrated in FIG. 2, the processes from the first step (S-21) to the third step (S-23). In the following description, the treatment at the first step is sometimes described as "second pretreatment".

(a) First Step

As the pretreatment step, the aluminum powder 52, the fluoride powder 54, and the sodium hydroxide powder 55 are mixed and rubbed to each other. After the treatment, the resulting mixture is charged into the vessel; and then, the vessel is closed with the cap so as to make the atmosphere of 10% or less of humidity. Next, the vessel is put in a furnace and heated under the atmosphere of a temperature of 100° C. or higher and 330° C. or lower for 30 minutes or longer to release part of the water included in the sodium hydroxide to the aluminum (Al) and the sodium fluoride (NaF), thereby forming the aluminum oxide film and the sodium oxide ($Na_2O$) on the particle surface of the aluminum (Al) powder 52. At this time, because the water amount from the sodium hydroxide is so large, and also the sodium oxide is present on the aluminum surface, oxidation of the aluminum preferentially takes place. Thus, the reaction to form the aluminum fluoride from the hydrogen fluoride takes place only a little.

After this heat treatment, the powder is cooled and then mixed with the sodium borate powder. After or before the resulting mixed powder is charged into the tightly sealed vessel, a non-oxidative gas is introduced into the tightly sealed vessel to fill the inside thereof with the non-oxidative gas atmosphere. These processes are the first step.

Namely, the first step is the step at which, after the aluminum and the sodium hydroxide are mixed in advance (premixed) and heated, all the raw materials are mixed and charged into the tightly sealed vessel. By carrying out this first step under the atmosphere of 10% or less of humidity, attachment of the moisture in an air to the aluminum, the sodium hydroxide, and the fluoride as well as oxidation of the aluminum can be prevented. The resulting powder is mixed with the sodium borate powder. Thereafter, the timing when the tightly sealed vessel is filled with the non-oxidative gas may be after or before the raw materials are charged into the tightly sealed vessel.

(b) Second Step

As illustrated in FIG. 2, at the second step (S-22), all the mixed raw materials are charged into the tightly sealed vessel, and then the inside of this tightly sealed vessel is heated at the temperature of 400° C. or higher and 560° C. or lower to degas the remaining water included in the sodium hydroxide, the sodium borate, the aluminum powder, and the fluoride powder, and at the same time, to cause the water that failed to be degassed to react with the aluminum so as to be changed to hydrogen gas and the aluminum oxide film, thereby resulting in removal of the water. At this time, the sodium hydroxide that is attached to the aluminum surface is changed to sodium oxide. Also, part of the sodium oxide reacts with the oxide film of the aluminum surface to form the sodium aluminum dioxide ($NaAlO_2$). The second step is the step at which the remaining water included in the raw materials in the tightly sealed vessel is caused to react with aluminum, or is the step at which the water is removed from the reaction system by degassing using a vacuum pump.

(c) Third Step

The inside of the tightly sealed vessel was heated at the temperature of 490° C. or higher and 560° C. or lower, and the hydrogen gas was introduced thereinto. By heating, the oxide film and the sodium aluminum dioxide ($NaAlO_2$) on the aluminum surface are changed to the needle-like iota alumina by diffusion of the sodium oxide and the crystallization action of the aluminum oxide by the fluoride. When the sodium oxide reaches the aluminum (Al) surface, formation of sodium hydride (NaH) starts by the reducing action of the aluminum. When the sodium hydride (NaH) diffuses in the iota alumina thereby contacting with the sodium borate, the sodium borohydride reaction starts. When the sodium borohydride fills the iota alumina layer, the sodium hydride (NaH), the sodium oxide ($Na_2O$), the aluminum ion, the borate ion, and so forth can migrate in the sodium borohydride as the solvent to start the "particle stirring reaction". In the particle stirring reaction, the mass transfer can take place only by the contact of the particles, so that even a weak stirring is sufficient. By rotating the stirring means in the tightly sealed vessel, the stirring was conducted with the stirring rotation speed of 4.87 to 15.7 cm/sec in terms of the circumferential velocity (30 rpm to 60 rpm). The average hydrogen pressure was set to 0.7 MPa. With this, the sodium borohydride (SBH) was obtained.

The reaction yield calculation from the hydrogen decreased amount at the third step is calculated from the hydrogen amount obtained from the standard volume of the introduced hydrogen gas, the volume of the tightly sealed vessel, the average temperature of the vessel, and the hydrogen gas pressure.

Third Embodiment

Figure 3:
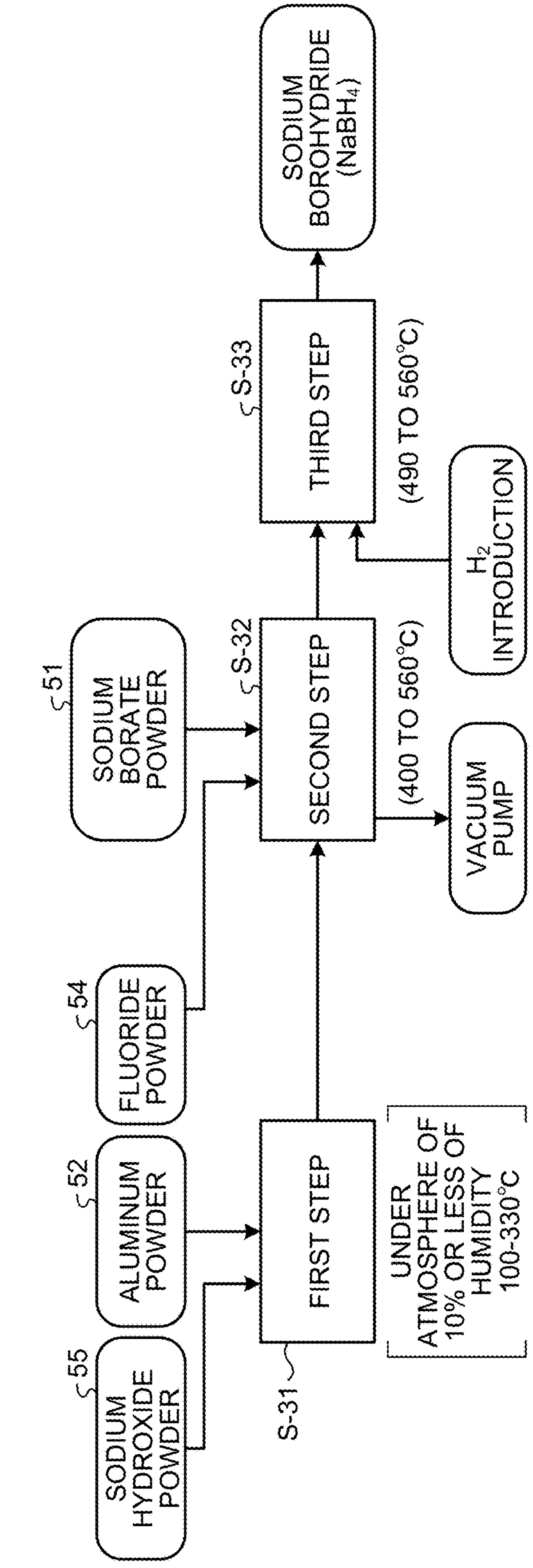
FIG. 3 is the process chart to produce sodium borohydride (SBH) according to the third embodiment in which a sodium borate is used as a raw material.

FIG. 3 is the process chart to produce the sodium borohydride (SBH) according to the third embodiment in which the sodium borate is used as the raw material. In the production method of the sodium borohydride according to the third embodiment, after the aluminum powder 52 and the sodium hydroxide powder 55 are mixed and are previously heated at the temperature of 100° C. or higher and 330° C.

or lower, this is further mixed with the fluoride powder 54 and the sodium borate powder 51; and then, after the resulting mixture is charged into the tightly sealed vessel, the water therein is removed using a vacuum pump with heating at 400° C. or higher and 560° C. or lower, which is followed by introducing the hydrogen gas and then carrying out the reaction at the temperature of 490° C. or higher and 560° C. or lower in the tightly sealed vessel that is filled with the hydrogen gas. Both the sodium borate powder 51 and the aluminum powder 52 react as they are in the solid phase state. As illustrated in FIG. 3, the production method of the sodium borohydride according to the third embodiment includes the processes from the first step (S-31) to the third step (S-33). In the following description, the processes in the first and second steps are sometimes described as the "third pretreatment".

(a) First Step

As the pretreatment step, the aluminum powder 52 and the sodium hydroxide powder 55 are mixed and rubbed to each other. After the treatment, the resulting mixture is charged into the vessel; and then, the vessel is closed with the cap to make the atmosphere of 10% or less of humidity. Next, the vessel is put in a furnace and heated under an atmosphere of 100° C. or higher and 330° C. or lower for 30 minutes or longer to release part of the water included in the sodium hydroxide to the aluminum (Al) to form the aluminum oxide film and the sodium oxide ($Na_2O$) on the particle surface of the aluminum (Al) powder 52.

After the resulting powder mixture is cooled, this is mixed with the sodium borate powder and the fluoride powder. After or before the resulting mixed powder is charged into the tightly sealed vessel, a non-oxidative gas is introduced into the tightly sealed vessel to fill the inside thereof with the non-oxidative gas atmosphere. These processes are the first step. Namely, the first step is the step at which, after the aluminum and the sodium hydroxide are mixed in advance (premixed) and heated, all the raw materials are mixed and charged into the tightly sealed vessel. By carrying out this first step under the atmosphere of 10% or less of humidity, attachment of the moisture in an air to the aluminum, the sodium hydroxide, and the fluoride as well as oxidation of the aluminum can be prevented. The resulting powder is mixed with the sodium borate powder. Thereafter, the timing when the tightly sealed vessel is filled with the non-oxidative gas may be after or before the raw materials are charged into the tightly sealed vessel.

(b) Second Step

As illustrated in FIG. 3, at the second step (S-32), all the mixed raw materials are charged into the tightly sealed vessel, and then the inside of this tightly sealed vessel is heated at the temperature of 400° C. or higher and 560° C. or lower to degas the remaining water included in the sodium hydroxide, the sodium borate, the aluminum powder, and the fluoride powder, and at the same time, to cause the water that failed to be degassed to react with the aluminum so as to be changed to the hydrogen gas and the aluminum oxide film, so that water is removed. The sodium hydroxide that is attached to the aluminum surface is changed to sodium oxide. Part of the sodium oxide reacts with the oxide film on the aluminum surface to become sodium aluminum dioxide ($NaAlO_2$). The second step is the step at which the remaining water included in the raw materials in the tightly sealed vessel is caused to react with aluminum, or is the step at which the water is removed from the reaction system by degassing using a vacuum pump.

(c) Third Step

The inside of the tightly sealed vessel was heated at the temperature of 490° C. or higher and 560° C. or lower, and the hydrogen gas was introduced thereinto. By heating, the oxide film and the sodium aluminum dioxide ($NaAlO_2$) on the aluminum surface are changed to the needle-like iota alumina by diffusion of the sodium oxide and the crystallization action of the aluminum oxide by the fluoride. When the sodium oxide reaches the aluminum (Al) surface, formation of sodium hydride (NaH) starts by the reducing action of the aluminum. When the sodium hydride (NaH) diffuses in the iota alumina thereby contacting with the sodium borate, the sodium borohydride reaction starts. When the sodium borohydride fills the iota alumina layer, the sodium hydride (NaH), the sodium oxide ($Na_2O$), the aluminum ion, the borate ion, and so forth can migrate in the sodium borohydride as the solvent to start the "particle stirring reaction". In the particle stirring reaction, the mass transfer can take place only by the contact of the particles, so that even a weak stirring is sufficient. By rotating the stirring means in the tightly sealed vessel, the stirring was conducted with the stirring rotation speed of 4.87 to 15.7 cm/sec in terms of the circumferential velocity (30 rpm to 60 rpm). The average hydrogen pressure was set to 0.7 MPa. With this, the sodium borohydride (SBH) was obtained.

The reaction yield calculation from the hydrogen decreased amount at the third step is calculated from the hydrogen amount obtained from the standard volume of the introduced hydrogen gas, the volume of the tightly sealed vessel, the average temperature of the vessel, and the hydrogen gas pressure.

Fourth Embodiment

Figure 4:
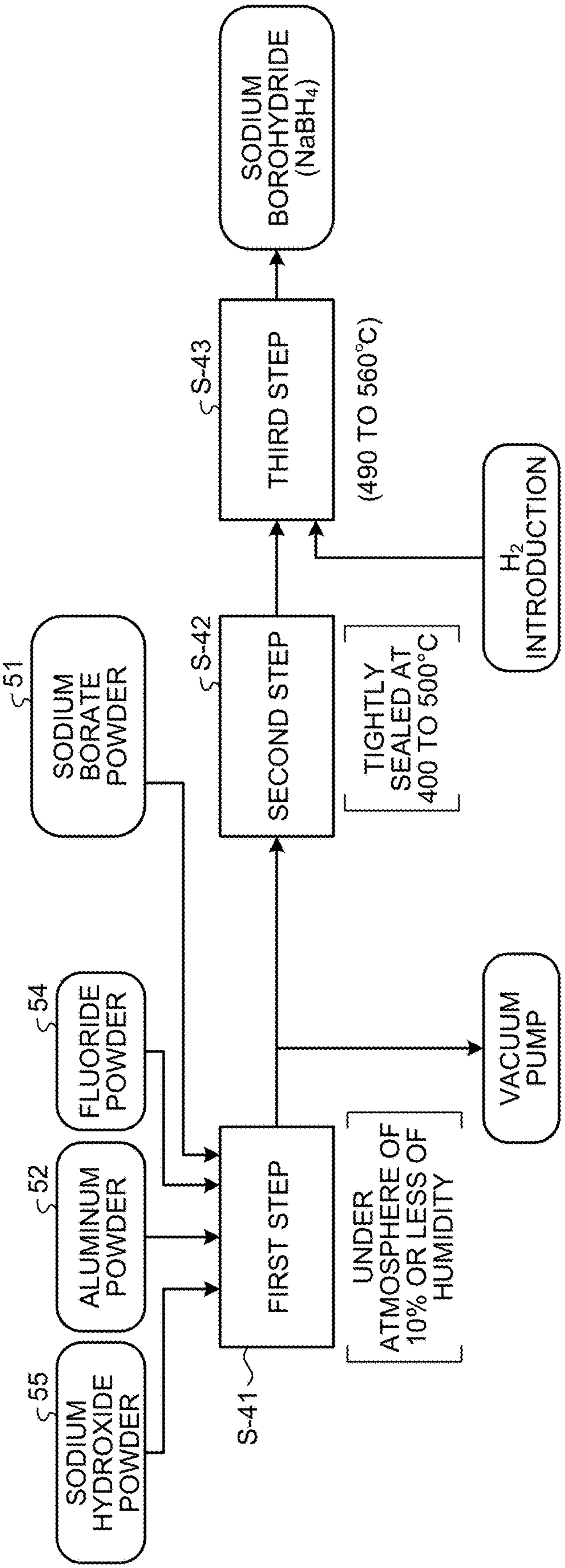
FIG. 4 is the process chart to produce sodium borohydride (SBH) according to the fourth embodiment in which a sodium borate is used as a raw material.

FIG. 4 is the process chart to produce the sodium borohydride (SBH) according to the fourth embodiment in which the sodium borate is used as the raw material. In the production method of the sodium borohydride according to the fourth embodiment, at the first step, after the aluminum powder 52, the sodium hydroxide powder 55, the fluoride powder 54, and the sodium borate powder 51 are mixed and charged into the tightly sealed vessel, the vessel is filled with a non-oxidative gas, and then, this is sealed. At the second step, these are heated under the tightly sealed state of the vessel at 400° C. or higher and 560° C. or lower to cause the reaction between the water that is generated from the raw materials and the fluoride to generate hydrogen fluoride in the gas state, which is then caused to react with the aluminum to form the aluminum fluoride on the aluminum surface. Then, at the third step, the reaction is carried out in the tightly sealed vessel filled with the hydrogen gas at the temperature of 490° C. or higher and 560° C. or lower. Both the sodium borate and the aluminum powder are reacted as they are in the solid phase state. As illustrated in FIG. 4, the production method of the sodium borohydride according to the fourth embodiment includes the processes from the first step (S-41) to the third step (S-43). In the following description, the processes in the first and second steps are sometimes described as the "fourth pretreatment".

(a) First Step

As the pretreatment step, under an atmosphere of 10% or less of humidity, the aluminum powder 52, the sodium hydroxide powder 55, and the fluoride powder 54 are mixed and rubbed to each other and then, the sodium borate powder 51 is mixed thereto. Then, after or before they are charged into the tightly sealed vessel, a non-oxidizing gas is introduced into the tightly sealed vessel to fill the inside thereof with the non-oxidative gas atmosphere. These processes are the first step. The timing to introduce the non-oxidative gas may be after or before the raw materials are charged into the tightly sealed vessel. The method of mixing the raw materials is not limited to this; so, all the raw materials, i.e., the aluminum powder 52, the sodium hydroxide powder 55, the fluoride powder 54, and the sodium borate powder 51, may be simultaneously mixed and rubbed together.

(b) Second Step

As illustrated in FIG. 4, at the second step (S-42), after the vessel is tightly sealed, the inside of the tightly sealed vessel is heated at the temperature of 400° C. or higher and 560° C. or lower to remove the remaining water included in the sodium hydroxide, the sodium borate, the aluminum powder, and the fluoride powder by reacting this water with Al; and also, the water at a high temperature is caused to react with the fluoride to generate a vapor of hydrogen fluoride (HF) to form the aluminum fluoride on the aluminum surface; and thus, this step is also the step at which the water is removed and the aluminum fluoride is formed. At this time, the sodium hydroxide is changed to the sodium oxide. Also, part of the sodium oxide reacts with the oxide film of the aluminum surface to form the sodium aluminum dioxide ($NaAlO_2$). The second step is the step at which the remaining water included in the raw materials in the tightly sealed vessel is removed and the aluminum fluoride is formed.

(c) Third Step

The inside of the tightly sealed vessel was heated at the temperature of 490° C. or higher and 560° C. or lower, and the hydrogen gas was introduced thereinto. By heating, the oxide film and the sodium aluminum dioxide ($NaAlO_2$) on the aluminum surface are changed to the needle-like iota alumina by diffusion of the sodium oxide and the crystallization action of the aluminum oxide by the fluoride. When the sodium oxide reaches the aluminum (Al) surface, formation of sodium hydride (NaH) starts by the reducing action of the aluminum. When the sodium hydride (NaH) diffuses in the iota alumina thereby contacting with the sodium borate, the sodium borohydride formation reaction starts. When the sodium borohydride fills the iota alumina layer, the sodium hydride (NaH), the sodium oxide ($Na_2O$), the aluminum ion, the borate ion, and so forth can migrate in the sodium borohydride as the solvent to start the "particle stirring reaction". The aluminum fluoride formed on the aluminum surface at the second step incorporates the sodium ion that is diffused thereto to form the NaAlF layer on the aluminum surface as the cryolite ($Na_3AlF_6$). In the interface with Al, the NaAlF layer forms the lower fluorinated aluminum ($AlF_{1.5}$), which moves in the system as a strong reducing substance and as a vapor, and reacts with sodium oxide ($Na_2O$) to form the sodium hydride (NaH) and the alumina, thereby assisting formation of the sodium borohydride. In the particle stirring reaction, the mass transfer can take place only by the contact of the particles, so that even a weak stirring is sufficient. By rotating the stirring means in the tightly sealed vessel, the stirring was conducted with the stirring rotation speed of 4.87 to 15.7 cm/sec in terms of the circumferential velocity (30 rpm to 60 rpm). The average hydrogen pressure was set to 0.7 MPa. With this, the sodium borohydride (SBH) was obtained.

TEST EXAMPLES AND COMPARATIVE EXAMPLES

Hereinafter, Test Examples and Comparative Examples are going to be described. Note that each embodiment is not limited to these Test Examples.

Test Example 1

(a) First Step

After 11.45 g of aluminum (Al: average particle diameter of 30 μm) powder and 1.86 g of sodium fluoride (NaF) powder were mixed, the resulting mixture was charged into a vessel; and then, this was held for 1 hour with heating at 240° C. and then cooled to carry out the first pretreatment. Next, 17.46 g of the sodium metaborate powder was added and mixed; then, the resulting mixture was charged into the tightly sealed horizontal type vessel 10D having the wide paddle (WP) stirrer 37, as illustrated in FIG. 9.

(b) Second Step

As the water removal step, the tightly sealed vessel was connected to a vacuum pump; then, the water removal operation was carried out with degassing at the heating temperature of 510° C. for 0.47 hours.

(c) Third Step

After the first pretreatment and the water removal operation, keeping as it is, the inside of the tightly sealed vessel was heated to 517° C. with introducing the hydrogen gas thereinto and rotating the stirring means in the tightly sealed vessel at the stirring rotation speed of 7.7 cm/s in terms of the circumferential velocity (30 rpm) for 13.0 hours with keeping the heating temperature at 517° C. In the way as described above, the sodium borohydride (SBH) was obtained. The reaction yield (SBH yield) of Test Example 1 was 94.1%. The reaction rate at the reaction yield of 10% was 191%/hour. The reaction rate at the reaction yield of 70% was 9.9%/hour. The time lag in Test Example 1 was 1.02 hours. The Na/B (mole ratio) of Test Example 1 is 1.17. The particle stirring reaction took place; and thus, the satisfactory results were obtained in the time lag and the reaction yield.

Test Example 2

(a) First Step

After 3.82 g of aluminum (Al: average particle diameter of 30 μm) powder and 0.52 g of sodium fluoride powder (sodium hexafluoroaluminate ($Na_3AlF_6$)) were mixed, the resulting mixture was charged into a vessel; and then, this was held for 1 hour with heating at 100° C. and then cooled to carry out the first pretreatment. Next, 5.82 g of sodium metaborate powder was added and mixed; then, the resulting mixture was charged into the tightly sealed vessel 10B having the multi-blade (MB) scraper equipped with a plurality of the scrapers 35, as illustrated in FIG. 7.

(b) Second Step

As the water removal step, the tightly sealed vessel was connected to a vacuum pump; then, the water removal operation was carried out with degassing at the heating temperature of 510° C. for 0.47 hours.

(c) Third Step

After the first pretreatment and the water removal operation, keeping as it is, the inside of the tightly sealed vessel was heated to 531° C. with introducing the hydrogen gas thereinto and rotating the stirring means in the tightly sealed vessel at the stirring rotation speed of 15.4 cm/s in terms of the circumferential velocity (60 rpm) for 6.4 hours with keeping the heating temperature at 531° C. In the way as described above, the sodium borohydride (SBH) was obtained. The reaction yield (SBH yield) of Test Example 2 was 65.2%. The reaction rate at the reaction yield of 10% was 106%/hour. The time lag in Test Example 2 was 2.22 hours. The Na/B (mole ratio) of Test Example 2 is 1.08. The particle stirring reaction took place, in which the Na/B ratio was low and the time lag slightly prolonged. Taking the short third step into consideration, a good reaction yield was resulted.

Test Example 3

In place of Test Example 2, at the first step, under the atmosphere of 10% or less of humidity, 3.82 g of aluminum (Al: average particle diameter of 30 μm) powder, 0.52 g of sodium hexafluoroaluminate powder ($Na_3AlF_6$), and 0.1 g of sodium hydroxide (NaOH) powder were mixed; then, the resulting mixture was held for 1 hour with heating at 100° C., then cooled under the atmosphere of 10% or less of humidity to carry out the second pretreatment After 5.82 g of sodium metaborate powder ($NaBO_2$) was added and mixed, the resulting mixture was charged into the tightly sealed vessel.

At the third step, the same procedure as Test Example 2 was followed except that the heating temperature was kept at 530° C., and the stirring period was changed to 12.4 hours. In the way as described above, the sodium borohydride (SBH) was obtained. The reaction yield (SBH yield) of Test Example 3 was 81.9%. The reaction rate at the reaction yield of 10% was 66%/hour. The time lag in Test Example 3 was 1.13 hours. The Na/B (mole ratio) of Test Example 3 is 1.11. The particle stirring reaction took place, in which by the heating at the first step, the time lag was improved. Taking the low Na/B ratio into consideration, a good reaction yield was resulted.

Test Example 4

In place of Test Example 2, at the first step, under the atmosphere of 10% or less of humidity, 3.82 g of aluminum (Al: average particle diameter of 30 μm) powder and 0.1 g of sodium hydroxide (NaOH) powder were mixed; then, the resulting mixture was charged into the vessel under the atmosphere of 10% or less of humidity, and this was held for 1 hour with heating at 240° C., which was then followed by cooling under the atmosphere of 10% or less of humidity. At the second step, 0.62 g of sodium fluoride (NaF) as the fluoride and 5.82 g of sodium metaborate ($NaBO_2$) powder were added and mixed, and then, the resulting mixture was charged into the tightly sealed vessel to carry out the third pretreatment.

At the third step, the same procedure as Test Example 2 was followed except that the heating temperature was kept at 530° C., and that the stirring period was changed to 10.9 hours. In the way as described above, the sodium borohydride (SBH) was obtained. The reaction yield (SBH yield) of Test Example 4 was 90.0%. The reaction rate at the reaction yield of 10% was 198%/hour. The time lag in Test Example 4 was 0.58 hours. The Na/B (mole ratio) of Test Example 4 is 1.20. The particle stirring reaction took place, in which by the heating of the aluminum and the sodium hydroxide at the first step, the time lag was improved. A good reaction yield was resulted.

Test Example 5

In place of Test Example 2, at the first step, under the atmosphere of 10% or less of humidity, 3.82 g of aluminum (Al: average particle diameter of 30 μm) powder, 0.1 g of sodium hydroxide (NaOH) powder, and 0.62 g of sodium fluoride (NaF) were mixed; then, the resulting mixture was charged into the vessel under the atmosphere of 10% or less of humidity, and held for 1 hour with heating at 100° C., which was then followed by cooling under the atmosphere of 10% or less of humidity to carry out the second pretreatment. At the second step, 5.82 g of sodium metaborate ($NaBO_2$) was added and mixed; then, the resulting mixture was charged into the tightly sealed vessel.

At the third step, the same procedure as Test Example 2 was followed except that the heating temperature was kept at 500° C., and the stirring period was changed to 3.6 hours. In the way as described above, the sodium borohydride (SBH) was obtained. The reaction yield (SBH yield) of Test Example 5 was 68.4%. The reaction rate at the reaction yield of 10% was 114%/hour. The time lag in Test Example 5 was 1.19 hours. The Na/B (mole ratio) of Test Example 5 is 1.20. The particle stirring reaction took place, in which by the heating after mixing of the aluminum, the sodium hydroxide, and the sodium fluoride at the first step, the time lag was improved. Taking the short stirring period at the third step into consideration, a good reaction yield was resulted.

Test Example 6

In place of Test Example 5, at the second step, a vacuum pump was connected to the tightly sealed vessel; and then, the water removal operation by degassing was carried out with keeping the heating temperature at 530° C. under the tightly sealed condition held for 0.42 hours.

At the third step, the same procedure as Test Example 5 was followed except that the inside of the tightly sealed vessel was heated at 530° C., and the stirring means in the tightly sealed vessel was rotated with the stirring rotation speed of 15.7 cm/s in terms of the circumferential velocity (60 rpm), and the stirring was done for 5.9 hours with keeping the heating temperature at 530° C. In the way as described above, the sodium borohydride (SBH) was obtained. The reaction yield (SBH yield) of Test Example 6 was 80.1%. The reaction rate at the reaction yield of 10% was 112%/hour. The time lag in Test Example 6 was 1.11 hours. The Na/B (mole ratio) of Test Example 6 is 1.20. The particle stirring reaction took place, in which by the heating after mixing of the aluminum, the sodium hydroxide, and the sodium fluoride at the first step, the time lag was improved. There was no effect of the heating temperature of 530° C. at the second step. Taking the short stirring period at the third step into consideration, a good reaction yield was resulted.

Test Example 7

In place of Test Example 6, the heating temperature at the first step was changed to 150° C., and at the second step, a vacuum pump was connected to the tightly sealed vessel; and then, the water removal operation by degassing was carried out with keeping the heating temperature at 530° C. under the tightly sealed condition held for 0.33 hours.

At the third step, the same procedure as Test Example 6 was followed except that the inside of the tightly sealed vessel was heated at 530° C., and the stirring means in the tightly sealed vessel was rotated with the stirring rotation speed of 15.7 cm/s in terms of the circumferential velocity (60 rpm), and the stirring was done for 4.8 hours with keeping the heating temperature at 530° C. In the way as described above, the sodium borohydride (SBH) was obtained. The reaction yield (SBH yield) of Test Example 7 was 77.3%. The reaction rate at the reaction yield of 10% was 132%/hour. The time lag in Test Example 7 was 1.68 hours. The Na/B (mole ratio) of Test Example 7 is 1.19. The particle stirring reaction took place, in which by the heating after mixing of the aluminum, the sodium hydroxide, and the sodium fluoride at the first step, the time lag was improved. Taking the short stirring period at the third step into consideration, a good reaction yield was resulted.

Test Example 8

In place of Test Example 6, the heating temperature at the first step was changed to 250° C., and at the second step, a vacuum pump was connected to the tightly sealed vessel; and then, the water removal operation by degassing was carried out with keeping the heating temperature at 530° C. under the tightly sealed condition held for 0.34 hours.

At the third step, the same procedure as Test Example 6 was followed except that the inside of the tightly sealed vessel was heated at 531° C., and the stirring means in the tightly sealed vessel was rotated with the stirring rotation speed of 15.7 cm/s in terms of the circumferential velocity (60 rpm), and the stirring was done for 14.3 hours with keeping the heating temperature at 530° C. In the way as described above, the sodium borohydride (SBH) was obtained. The reaction yield (SBH yield) of Test Example 8 was 94.1%. The reaction rate at the reaction yield of 10% was 142%/hour. The time lag in Test Example 8 was 1.03 hours. The Na/B (mole ratio) of Test Example 8 is 1.19. The particle stirring reaction took place, in which by the heating after mixing of the aluminum, the sodium hydroxide, and the sodium fluoride at the first step, the time lag was improved. A good reaction yield was resulted.

Test Example 9

In place of Test Example 6, the heating temperature at the first step was changed to 325° C., and at the second step, a vacuum pump was connected to the tightly sealed vessel; and then, the water removal operation by degassing was carried out with keeping the heating temperature at 530° C. under the tightly sealed condition held for 0.3 hours. At the third step, the same procedure as Test Example 6 was followed except that the inside of the tightly sealed vessel was heated at 530° C., and the stirring means in the tightly sealed vessel was rotated with the stirring rotation speed of 15.7 cm/s in terms of the circumferential velocity (60 rpm), and the stirring was done for 4.7 hours with keeping the heating temperature at 530° C. In the way as described above, the sodium borohydride (SBH) was obtained. The reaction yield (SBH yield) of Test Example 9 was 72.0%. The reaction rate at the reaction yield of 10% was 126%/hour. The time lag in Test Example 9 was 2.29 hours. The Na/B (mole ratio) of Test Example 9 is 1.20. The particle stirring reaction took place, in which by the heating after mixing of the aluminum, the sodium hydroxide, and the sodium fluoride at the first step, the time lag was improved. The reaction yield was less than Test Example 8.

Comparative Example 1

In Comparative Example 1, in place of Test Example 2, at the first step in Test Example 2, 5.82 g of sodium metaborate ($NaBO_2$), 3.81 g of aluminum (Al: average particle diameter of 30 μm) powder, and 0.1 g of sodium hydroxide (NaOH) were simultaneously mixed. Here, the pretreatment heating was not carried out. At the second step, a vacuum pump was connected to the tightly sealed vessel; and then, the water removal operation by degassing was carried out for 1.51 hours with keeping the heating temperature at 510° C.

After the second step, keeping as it is, the inside of the tightly sealed vessel was heated to 530° C., and the hydrogen gas was introduced thereinto; then, the stirring means in the tightly sealed vessel was rotated at the stirring rotation speed of 15.7 cm/s in terms of the circumferential velocity (60 rpm) for 9.7 hours with keeping the heating temperature at 530° C. In the way as described above, the sodium borohydride (SBH) was obtained. The reaction yield (SBH yield) of Comparative Example 1 was 24.8%. The reaction rate failed to reach the reaction rate of the particle stirring reaction in Comparative Example 1 (20%/hour or more); the reaction rate at the reaction yield of 10% was 3.0%/hour.

The time lag in Comparative Example 1 was 2.86 hours. The Na/B (mole ratio) of Comparative Example 1 is 1.03. The particle stirring reaction did not take place. At the first step, only the aluminum, the sodium hydroxide, and the sodium metaborate were used, with no addition of the fluoride. There was no heating carried out after mixing. As a result, the reaction yield was less than Test Example 2.

Comparative Example 2

In place of Example 4, in Comparative Example 2 all the raw materials were mixed simultaneously at the first step and no heating was carried out. At the second step, a vacuum pump was connected to the tightly sealed vessel; and then, the water removal operation by degassing was carried out for 0.33 hours with keeping the heating temperature at 530° C.

Keeping as it is, the same procedure as Test Example 4 was followed except that after the second step, the inside of the tightly sealed vessel was heated to 530° C., the hydrogen gas was introduced, and the stirring means in the tightly sealed vessel was rotated with keeping the heating temperature at 530° C. for 13.8 hours. In the way as described above, the sodium borohydride (SBH) was obtained. The reaction yield (SBH yield) of Comparative Example 2 was 79.3%. The reaction rate at the reaction yield of 10% was 82.0%/hour. The time lag in Comparative Example 2 was 4.36 hours. The Na/B (mole ratio) of Comparative Example 2 is 1.19. The particle stirring reaction took place, in which a good reaction yield was resulted. However, at the first step, the aluminum, the sodium hydroxide, the sodium metaborate, and the fluoride were added, but there was no heating after the mixing in the first step carried out. As a result, the time lag was longer and the reaction yield was lower than Example 4.

Comparative Example 3

In Comparative Example 3, in place of Test Example 1, at the first step, after 11.45 g of aluminum and 0.31 g of sodium hydroxide powder were mixed under the atmosphere of 10% or less of humidity, the resulting mixture was charged into the vessel. After the vessel was covered with the cap, the mixture was heated at 240° C. for 1 hour; then, this was cooled under the atmosphere of 10% or less of humidity. At the second step, 1.86 g of sodium fluoride powder and 17.46 g of sodium metaborate were added and mixed; then, the resulting mixture was charged into the tightly sealed vessel. After the vessel was connected to a vacuum pump, the water removal operation by degassing was carried out for 0.69 hours with keeping the heating temperature at 480° C.

Keeping as it is, the same procedure as Test Example 1 was followed except that the inside of the tightly sealed vessel was heated to 478° C., and the stirring means in the tightly sealed vessel was rotated with keeping the heating temperature at 478° C. for 13.5 hours.

In the way as described above, the sodium borohydride (SBH) was obtained. The reaction yield (SBH yield) of Comparative Example 3 was 19.7%. The time corresponding to the time lag in Comparative Example 3 was 4.8 hours. The reaction rate at the reaction yield of 10% was slow with 2.0%/hour. The Na/B (mole ratio) of Comparative Example 3 is 1.20.

The reaction product was particulate, but the particle stirring reaction did not take place. The reason that the particle stirring reaction did not take place is because the sodium borohydride did not melt at the heating temperature of 478° C. at the third step.

The time corresponding to the time lag, the reaction yield, and the reaction rate were all poor. From the SEM analysis, it was recognized that the iota alumina layer was partially formed.

Comparative Example 4

In Comparative Example 4, in place of Comparative Example 1, 6.98 g of sodium metaborate ($NaBO_2$), 8.01 g of sodium tetraborate ($Na_2B_4O_7$), 11.45 g of aluminum (Al: average particle diameter of 30 μm) powder, and 2.17 g of sodium fluoride were simultaneously mixed, and the heating was not carried out. At the second step, a vacuum pump was connected to the tightly sealed vessel; and then, the water removal operation was carried out with degassing at the heating temperature of 510° C. for 0.56 hours. After the second step, the hydrogen gas was introduced, and then, the inside of the tightly sealed vessel was heated to 510° C., and the stirring means in the tightly sealed vessel was rotated with keeping the heating temperature at 510° C. for 23.3 hours. In the way as described above, the sodium borohydride (SBH) was obtained. The reaction yield (SBH yield) of Comparative Example 4 was 52.3%. The reaction rate at the reaction yield of 10% was 5.5%/hour. The time corresponding to the time lag in Comparative Example 5 was 9.83 hours. The Na/B (mole ratio) of Comparative Example 4 is 0.89. The reaction product after the test was particulate, but the particle stirring reaction with a fast reaction rate did not take place. When the Na/B (mole ratio) was less than 1 as in the case of Comparative Example 4, the bonding strength between the boric acid and the sodium oxide ($Na_2O$) increased, so that the change to the iota alumina was delayed and the time corresponding to the time lag was prolonged thereby leading to the decrease in the concentration of the sodium ion in the iota alumina layer, this in turn resulted in the decrease in the sodium borohydride formation speed, as well as in the reaction rate and the reaction yield.

Comparative Example 5

In Comparative Example 5, in place of Comparative Example 1, 17.46 g of sodium metaborate ($NaBO_2$), 2.17 g of sodium fluoride (NaF), and 11.45 g of aluminum (Al: average particle diameter of 30 μm) powder were simultaneously mixed, and the heating was not carried out. At the second step, a vacuum pump was connected to the tightly sealed vessel; and then, the water removal operation by degassing was carried out for 0.35 hours with keeping the heating temperature at 580° C. After the second step, keeping as it is, the inside of the tightly sealed vessel was heated to 580° C., and then, the hydrogen gas was introduced; then, the stirring means in the tightly sealed vessel was rotated with keeping the heating temperature at 580° C. for 17.2 hours. In the way as described above, the sodium borohydride (SBH) was obtained. The reaction yield (SBH yield) of Comparative Example 5 was 14.4%. The time corresponding to the time lag in Comparative Example 5 was 0.95 hours. The reaction rate at the reaction yield of 10% was 1.3%/hour. The Na/B (mole ratio) of Comparative Example 5 is 1.19. The particle stirring reaction did not take place.

Because the temperature at the time of stirring was high, the time corresponding to the time lag was short. Both the reaction rate and the reaction yield were low.

Comparative Example 6

In Comparative Example 6, in place of Comparative Example 1, 12.50 g of aluminum powder, 17.46 g of sodium metaborate ($NaBO_2$), and 2.0 g of sodium hydroxide (NaOH) were mixed; and at the second step, a vacuum pump was connected to the tightly sealed vessel, and then the water removal operation by degassing was carried out for 4.0 hours with keeping the heating temperature at 510° C. After the second step, at the third step, the inside of the tightly sealed vessel was heated to 510° C., and then, the hydrogen gas was introduced; then, the stirring means in the tightly sealed vessel was rotated with keeping the heating temperature at 510° C. for 35 hours. In the way as described above, the sodium borohydride (SBH) was obtained. The reaction yield (SBH yield) of Comparative Example 6 was 14.1%. The reaction rate at the reaction yield of 10% was 0.4%/hour. Comparative Example 6 was not the high-speed reaction; and thus, the time corresponding to the time lag was considered to be 35 hours, which is the same as the stirring time. The Na/B (mole ratio) of Comparative Example 6 is 1.19. The particle stirring reaction did not take place. Both the reaction rate and the reaction yield were low. It is presumed that because the heating time at the second step was long, the oxide film of aluminum became thick due to the water in sodium hydroxide and the crystallization advanced so that the sodium oxide failed to diffuse.

Comparative Example 7

In Comparative Example 7, in place of Test Example 5, the same procedure as Test Example 5 was followed except that the addition amount of the fluoride was changed to 1.86 g; then, at the second step, a vacuum pump was connected to the tightly sealed vessel; and then, the water removal operation by degassing was carried out for 0.49 hours with keeping the heating temperature at 530° C. After the second step, keeping as it is, at the third step, the inside of the tightly sealed vessel was heated to 530° C., and the stirring means in the tightly sealed vessel was rotated with keeping the heating temperature at 530° C. for 12.6 hours. In the way as described above, the sodium borohydride (SBH) was obtained. The reaction yield (SBH yield) of Comparative Example 7 was 77.9%. The reaction rate at the reaction yield of 10% was 47%/hour, and the reaction rate at the reaction yield of 70% was 1.3%/hour. The time lag in Comparative Example 7 was 2.33 hours. The Na/B (mole ratio) of Comparative Example 7 is 1.53. The particle stirring reaction took place in the early stage of the reaction, but in the later stage of the reaction, the Na/B was high, and the sherbet-like stirring product was resulted, so that the reaction rate decreased. The time lag was prolonged.

Comparative Example 8

In place of Test Example 1, the ceramic ball (diameter of 3 mm) was put as the stirring medium into the tightly sealed vessel 10A as illustrated in FIG. 6; then, 1.94 g of sodium metaborate ($NaBO_2$), 1.27 g of aluminum powder, and 0.21 g of sodium fluoride (NaF) were added. At this time, the weight ratio of the stirring medium to the raw materials was set to 48. Without carrying out the pretreatment, the heating temperature at the third step was changed to 579° C., and the ball mill stirring was carried out with the circumferential velocity of 78.5 cm/s (300 rpm) for 13.8 hours to obtain the sodium borohydride (SBH). As a result, the reaction yield (SBH yield) was 71.9%. The reaction rate at the reaction yield of 10% was 90%/hour. The reaction rate at the reaction yield of 50% was slowed to 2.1%/hour. The Na/B (mole ratio) of Comparative Example 8 is 1.17. The time lag in Comparative Example 8 was 1.04 hours. From observation of the reaction product, the reaction was the mixture of the particle stirring reaction and the roll-crushing reaction. The aluminum particle was the mixture of the particulate retained and the particle that was rolled to a millefeuille-like shape. The reaction rate decreased from the reaction yield of about 40%. Even though the pretreatment was not carried out, the time lag was short because of the roll-crushing effect.

Test Example 16

In Test Example 16, in place of Test Example 1, at the first step, after 11.45 g of aluminum and 0.31 g of sodium hydroxide powder were mixed under the atmosphere of 10% or less of humidity, the resulting mixture was charged into the vessel. After the vessel was covered with the cap, the mixture was heated at 240° C. for 1 hour; then, this was cooled under the atmosphere of 10% or less of humidity. At the second step, 1.86 g of sodium fluoride powder and 17.46 g of sodium metaborate were added and mixed; then, the resulting mixture was charged into the tightly sealed vessel. After the vessel was connected to a vacuum pump, the water removal operation by degassing was carried out for 1.44 hours with keeping the heating temperature at 490° C. to carry out the third pretreatment.

Keeping as it is, the same procedure as Test Example 1 was followed except that the inside of the tightly sealed vessel was heated to 490° C., and the stirring means in the tightly sealed vessel was rotated with keeping the heating temperature at 490° C. for 23.7 hours. In the way as described above, the sodium borohydride (SBH) was obtained. The reaction yield (SBH yield) of Test Example 16 was 86.7%. The reaction rate at the reaction yield of 10% was 131%/hour. The time lag in Test Example 16 was as long as 3.36 hours because of the low testing temperature. The Na/B (mole ratio) of Test Example 16 is 1.19. The particle stirring reaction took place. This is because part of the sodium borohydride is in the molten state due to the heating temperature of 490° C. A good reaction yield was resulted.

Test Example 17

In Test Example 17, in place of Test Example 5, 0.41 g aluminum fluoride ($AlF_3$) was added as the fluoride. At the second step, a vacuum pump was connected to the tightly sealed vessel; and then, the water removal operation by degassing was carried out for 0.46 hours with keeping the heating temperature at 530° C. Keeping as it is, the same procedure as Test Example 5 was followed except that the inside of the tightly sealed vessel was heated to 532° C., and the stirring means in the tightly sealed vessel was rotated with keeping the heating temperature at 532° C. for 13.2 hours. In the way as described above, the sodium borohydride (SBH) was obtained. The reaction yield (SBH yield) of Test Example 17 was 73.8%. The reaction rate at the reaction yield of 10% was 25%/hour. The Na/B (mole ratio) of Test Example 17 is 1.03. The time lag in Test Example 17 was as long as 6.84 hours. This indicates that aluminum fluoride ($AlF_3$) bonded with the sodium ion to form cryolite ($Na_3AlF_6$) thereby lowering the substantial Na/B (mole ratio). The reaction time obtained by subtracting the time lag from the stirring time was 6.4 hours. This indicates that the average reaction rate was good.

FIG. 19 is the graph illustrating the relationship of the heating temperature at the second step and the third step after completion of the first step, the hydrogen pressure of the reaction system, the stirring rotation number, and the SBH reaction yield with the passage of time in Test Example 1. From the figure, it can be seen that there is the period of about 1.0 hour from the start of stirring during which the reaction rate is very slow. Then, it can be seen that when the reaction yield becomes more than about 3%, the reaction rate rapidly increases, and that this is kept until the reaction yield of 70%. Thereafter, the reaction yield decreases gradually. Hydrogen is additionally supplied; then, it can be seen that when the hydrogen pressure raises at the time of supply, the reaction rate increases as well. In order to improve the reaction time, namely, to shorten the reaction time, it can be seen that it is necessary to shorten the time lag and to increase the reaction rate during the period when the reaction is more than 70%.

The results of Test Examples 1 to 9 are summarized in Table 1. The results of Comparative Examples 1 to 8 and the Test Examples 16 and 17 are summarized in Table 2. FIG. 10 is the SEM mapping image of product of Test Example 1 with the first pretreatment. FIG. 11 is the SEM mapping image of the product of Comparative Example 3 with the second pretreatment and the reaction temperature of 478° C. FIG. 12 is the SEM mapping image of the product of Test Example 15 with the fourth pretreatment. FIG. 16 is the graph illustrating the relationship between the Na/B ratio and the time lag. FIG. 17 is the graph illustrating the relationship between the heating temperature and the time lag. FIG. 18 is the graph illustrating the relationship between the premix burning temperature and the time when the reaction yield reaches 60%.

As can be seen in FIG. 16, it was recognized that the Na/B ratio in the range of 1.15 to 1.25 is effective for shortening of the time lag.

As can be seen in FIG. 17, it was recognized that the heating temperature of 490° C. or higher is effective for shortening of the time lag. As can be seen in FIG. 18, it was recognized that the premix burning temperature in the range of 100 to 330° C. is effective for shortening of the time to reach the 60% reaction yield thereby increasing the reaction rate.

TABLE 1

| No. | Raw material Al [g] | Borate raw material $NaBO_2$ [g] | NaOH [g] | Additive [g] | Na/B (mol ratio) | Premix temper-ature [° C.] | Heating temper-ature [° C.] | Stirring time [Hr] | Reac-tion rate (at 10% yield) [%/Hr] | Time lag [Hr] | Reac-tion yield [%] |
|---|---|---|---|---|---|---|---|---|---|---|---|
| Test Example 1 | 11.45 | 17.46 | — | NaF: 1.86 | 1.17 | 240 | 517 | 13.0 | 191 | 1.03 | 94.1 |
| Test Example 2 | 3.82 | 5.82 | — | $Na_3AlF_6$: 0.52 | 1.08 | 100 | 531 | 6.4 | 36 | 2.22 | 65.2 |
| Test Example 3 | 3.82 | 5.82 | 0.10 | $Na_3AlF_6$: 0.52 | 1.11 | 100 | 530 | 12.4 | 66 | 1.13 | 81.9 |
| Test Example 4 | 3.82 | 5.82 | 0.10 | NaF: 0.62 | 1.20 | 240 | 530 | 10.9 | 198 | 0.58 | 90.0 |
| Test Example 5 | 3.82 | 5.82 | 0.10 | NaF: 0.62 | 1.19 | 100 | 500 | 3.6 | 114 | 1.19 | 68.4 |
| Test Example 6 | 3.82 | 5.82 | 0.11 | NaF: 0.62 | 1.20 | 100 | 530 | 5.9 | 112 | 1.11 | 80.1 |
| Test Example 7 | 3.82 | 5.82 | 0.10 | NaF: 0.62 | 1.19 | 150 | 530 | 4.8 | 132 | 1.68 | 77.3 |
| Test Example 8 | 3.82 | 5.82 | 0.10 | NaF: 0.62 | 1.19 | 250 | 531 | 14.3 | 142 | 1.03 | 94.1 |
| Test Example 9 | 3.82 | 5.24 | 0.10 | NaF: 0.62 | 1.20 | 325 | 530 | 4.7 | 126 | 2.29 | 72.0 |

TABLE 2

| No. | Raw material Al [g] | Borate raw material $NaBO_2$ [g] | NaOH [g] | Additive [g] | Na/B (mol ratio) | Premix temper-ature [° C.] | Heating temper-ature [° C.] | Stirring time [Hr] | Reac-tion rate (at 10% yield) [%/Hr] | Time lag [Hr] | Reac-tion yield [%] |
|---|---|---|---|---|---|---|---|---|---|---|---|
| Comparative Example 1 | 3.81 | 5.82 | 0.10 | NaF: 0.00 | 1.03 | — | 530 | 9.7 | 3.0 | 2.86 | 24.8 |
| Comparative Example 2 | 3.82 | 5.82 | 0.11 | NaF: 0.62 | 1.19 | — | 530 | 13.8 | 82.0 | 4.36 | 79.3 |
| Comparative Example 3 | 11.45 | 17.46 | 0.31 | NaF: 1.86 | 1.20 | 240 | 478 | 13.5 | 2.0 | 4.80 | 19.7 |
| Comparative Example 4 | 11.45 | 6.98 | — | NaF: 2.17 | 0.89 | — | 510 | 23.3 | 5.5 | 9.83 | 52.3 |
| Comparative Example 5 | 11.45 | 17.46 | — | NaF: 2.17 | 1.19 | — | 580 | 17.2 | 1.3 | 0.95 | 14.4 |
| Comparative Example 6 | 12.50 | 17.46 | 2.00 | NaF: 0.00 | 1.19 | 240 | 510 | 35.0 | 0.4 | 35.0 | 14.1 |
| Comparative Example 7 | 3.82 | 5.82 | 0.10 | NaF: 1.86 | 1.53 | 100 | 530 | 12.6 | 47 | 2.33 | 77.9 |
| Comparative Example 8 | 1.27 | 1.94 | — | NaF: 0.21 | 1.17 | — | 579 | 13.8* | 90 | 1.04 | 71.9 |
| Test Example 16 | 11.45 | 17.46 | 0.29 | NaF: 1.86 | 1.19 | 240 | 490 | 23.7 | 131 | 3.36 | 86.7 |
| Test Example 17 | 3.82 | 5.82 | 0.10 | $AlF_3$: 0.41 | 1.03 | 100 | 530 | 13.2 | 25 | 6.84 | 73.8 |

*Ball mill stirring

As can be seen from Test Example 1 to Test Example 9 in Table 1, owing to the pretreatment, it was able to realize the good particle stirring reaction in which the reaction rate after the time lag was excellent. In addition, in all of these, the time lag in the heating reaction was able to be decreased as compared with Comparative Examples 1 to 8. Therefore, by conducting the pretreatment as in Test Examples, the sodium fluoride (NaF) and the sodium hydroxide form the sodium aluminum dioxide on the surface of the aluminum (Al) particle thereby facilitating the change to the iota alumina by the fluoride to shorten the time lag, resulting in realization of the particle stirring reaction with the rapid reaction rate.

Test Example 10

In place of Test Example 4, at the first step, the same procedure as Test Example 4 was followed except that 3.82 g of aluminum powder, 5.82 g of sodium metaborate, 0.62 g of sodium fluoride, and 0.10 g of sodium hydroxide were used, and the heating temperature was made to 250° C., and during the third step, the reaction product was taken out once and crushed, and the furnace temperature was changed from 530° C. to 480° C., and the total stirring time was 23.5 hours. As a result, the reaction yield (SBH yield) was 96.3%. The reaction rate at the reaction yield of 10% was 134%/hour. The reaction rate at the reaction yield of 88% before crushing was 0.3%/hour, but immediately after the crushing, the reaction rate was improved to 7.1%/hour. The Na/B (mole ratio) of Test Example 10 is 1.20. The time lag in Test Example 10 was 0.5 hours. The condition of the product at the end of the test was granular.

Figure 20:
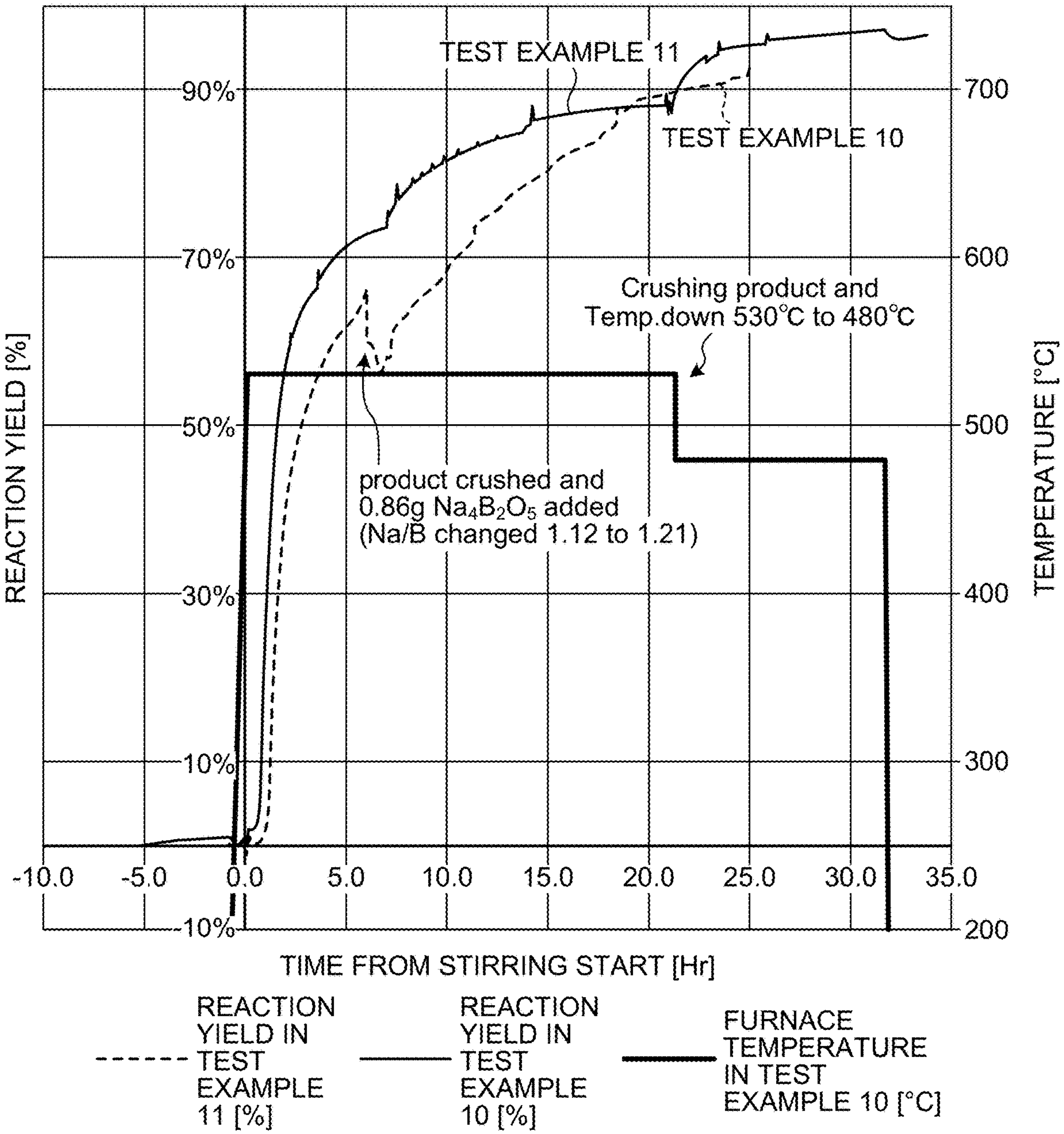
FIG. 20 is the graph illustrating the relationship among the furnace temperature, the stirring time, and the SBH reaction yield in Test Example 10, and the relationship between the stirring time and the SBH reaction yield in Test Example 11.

The relationship of the reaction yield and the furnace temperature with the time from the start of stirring in Test Example 10 is illustrated in FIG. 20. It can be seen that after crushing, the reaction yield still increased even when the temperature was lowered to 480° C.

Test Example 11

In place of Test Example 10, at the first step, 3.82 g of aluminum powder, 5.24 g of sodium metaborate, and 0.31 g of sodium fluoride were used, and at the third step, at the reaction yield of 65%, the reaction product was taken out from the tightly sealed vessel, crushed, and then, 0.86 g of sodium diborate ($Na_4B_2O_5$) was added to the crushed product; and then, the resulting mixture was returned to the tightly sealed vessel, and heating was resumed. The same procedure as Test Example 10 was followed except that the stirring time was made to a total of 23.1 hours. The Na/B ratio changed from 1.12 to 1.21. As a result, the reaction yield (SBH yield) was 92.9%. The reaction rate before the crushing was 3.4%/hour, but after the crushing and addition of sodium diborate ($Na_4B_2O_5$), the reaction rate was improved to 4.1%. The time lag in Test Example 11 was 0.95 hours. The condition of the product at the end of the test was granular. The relationship between the reaction yield and the time from the start of stirring in Test Example 11 is described in FIG. 20.

By crushing, in Test Example 10, the reaction rate increased significantly, and in Test Example 11, after the decrease in the reaction yield corresponding to the increase in the boron amount due to the additional addition of sodium diborate, the reaction yield decreased temporarily due to moisture, but recovered quickly, and the reaction rate thereafter slightly decreased. It is presumed that this improvement was caused because the agglomerated particle separates individually by crushing thereby leading to increase in the contacting area and chance between the unreacted aluminum (Al) particle and the sodium metaborate ($NaBO_2$).

In Test Example 10, after crushing, the furnace temperature was dropped from 530° C. to 480° C., which is below the melting point of sodium borohydride; but no decrease in the reaction rate was observed. This indicates that the inside of the individual aluminum particles was already filled with the products thereby enabling the diffusion migration, and that the unreacted materials were uniformly present in the individual particles.

The results of Test Examples 10 and 11 are summarized in Table 3.

reaction yield (SBH yield) was 96.3%, namely, the reaction yield increased as compared with the SBH reaction yield of Test Example 1 (94.1%).

In Test Example 11, because the iota alumina layer had already formed by the reaction, even when 0.86 g of sodium diborate ($Na_4B_2O_5$) was added during the course of the reaction, there was no effect of the water, such as stop of the reaction. Due to the effect of crushing, the reaction rate and yield were improved.

Test Example 12

In Test Example 12, contrary to Test Example 2, the premix treatment excluding sodium metaborate was not conducted, and at the first step, all the materials composed of 5.82 g of sodium metaborate ($NaBO_2$), 3.81 g of aluminum (Al: average particle diameter of 30 μm) powder, and 0.1 g of sodium hydroxide (NaOH) were simultaneously added and mixed. At the second step, a post-evacuation heating under tightly sealed condition was conducted with keeping the temperature at 100° C. for 1.05 hours. After this, keeping as it is, the inside of the tightly sealed vessel was heated to 530° C., and the stirring means in the tightly sealed vessel was rotated at the stirring rotation speed of 15.4 cm/s in terms of the circumferential velocity (60 rpm) for 5.5 hours with keeping the heating temperature at 530° C. In the way as described above, the sodium borohydride (SBH) was obtained. The reaction yield (SBH yield) of Test Example 12 was 71.2%. The reaction rate at the reaction yield of 10% was 161%/hour. The time lag in Test Example 12 was 1.48 hours. The Na/B (mole ratio) of Test Example 12 is 1.19.

Test Example 13

In Test Example 13, in place of Test Example 5, at the first step, the raw materials excluding sodium metaborate were mixed at room temperature under an atmosphere of 10% or less of humidity, and the resulting mixture was kept as a premix at room temperature for 2.0 hours, and sodium metaborate was mixed with them, and then, the resulting mixture was charged into the tightly sealed vessel. At the second step, the tightly sealed vessel was evacuated with a vacuum pump, followed by closing a valve and holding with heating at the temperature of 501° C. for 0.55 hours under tightly sealed condition to carry out the fourth pretreatment.

TABLE 3

| No. | Raw material Al [g] | Borate raw material $NaBO_2$ [g] | Borate raw material $Na_4B_2O_5$ [g] | NaOH [g] | Additive [g] | Na/B (mol ratio) Before crushing | Na/B (mol ratio) After crushing | Premix Temperature [° C.] | Heating temperature [° C.] Before crushing | Heating temperature [° C.] After crushing | Stirring time [Hr] | Reaction rate (at 10% yield) [%/Hr] | Time lag [Hr] | Reaction yield [%] |
|---|---|---|---|---|---|---|---|---|---|---|---|---|---|---|
| Test Example 10 | 3.82 | 5.82 | — | 0.10 | NaF: 0.62 | 1.20 | 1.20 | 250 | 530 | 480 | 23.5 | 134 | 0.50 | 96.3 |
| Test Example 11 | 3.82 | 5.82 | 0.86 | 0.10 | NaF: 0.00 | 1.12 | 1.21 | 250 | 530 | 530 | 23.1 | 78 | 0.95 | 92.9 |

*Additionally added when crushing

As can be seen in Table 3, in Test Example 10, because crushing was conducted during the course of the reaction, the particle stirring reaction was resumed, resulting in the increase in the reaction rate. It was recognized that the After the treatment, keeping as it is, the inside of the tightly sealed vessel was heated to 530° C., and the hydrogen gas was introduced thereinto, and then, the stirring means in the tightly sealed vessel was rotated at the stirring rotation speed of 15.4 cm/s in terms of the circumferential velocity (60 rpm) for 3.2 hours with keeping the heating temperature at 530° C. In the way as described above, the sodium borohydride (SBH) was obtained. The reaction yield (SBH yield) of Test Example 13 was 62.4%. The reaction rate at the reaction yield of 10% was 200%/hour. The time lag in Test Example 13 was 0.53 hours. The Na/B (mole ratio) of Test Example 13 is 1.19. The reaction was the particle stirring reaction. The time lag was improved. In spite of the short stirring time, the reaction rate and yield were good.

Test Example 14

In Test Example 14, in place of Test Example 1, at the first step, after 11.45 g of aluminum, 17.46 g of sodium metaborate, and 3.25 g of sodium fluoride were mixed, the resulting mixture was charged into the tightly sealed vessel. Heating thereafter was not carried out. At the second process, the hydrogen gas was introduced into the sealed vessel, and then a heating was carried out under the tightly sealed condition at the temperature of 510° C. After holding for 0.54 hours, the hydrogen gas was introduced. Keeping as it is, and with keeping the inside of the tightly sealed vessel at 510° C., the stirring means in the tightly sealed vessel was rotated at the stirring rotation speed of 7.7 cm/s in terms of the circumferential velocity (30 rpm) with keeping the heating temperature at 510° C. for 23.8 hours. In the way as described above, the sodium borohydride (SBH) was obtained. The reaction yield (SBH yield) of Test Example 14 was 88.3%. The reaction rate at the reaction yield of 10% was 186%/hour. The time lag in Test Example 14 was 1.07 hours. The Na/B (mole ratio) of Test Example 14 is 1.29. The reaction was the particle stirring reaction. The time lag was improved. A good reaction yield was resulted.

Test Example 15

In Test Example 15, in place of the first step in Test Example 5, 5.82 g of sodium metaborate ($NaBO_2$), 3.81 g of aluminum (Al: average particle diameter of 30 μm) powder, 0.1 g of sodium hydroxide (NaOH), and 0.62 g of sodium fluoride were simultaneously mixed, and then, the resulting mixture was charged into the tightly sealed vessel. At the second step, the tightly sealed vessel was evacuated with a vacuum pump, and then a valve was closed. With heating at 530° C. under the tightly sealed condition for 0.54 hours the fourth pretreatment was carried out. After the treatment, keeping as it is, the inside of the tightly sealed vessel was heated to 531° C., and the stirring means in the tightly sealed vessel was rotated at the stirring rotation speed of 15.7 cm/s in terms of the circumferential velocity (60 rpm) for 5.0 hours with keeping the heating temperature at 531° C. In the way as described above, the sodium borohydride (SBH) was obtained. The reaction yield (SBH yield) of Test Example 15 was 62.2%. The reaction rate at the reaction yield of 10% was 97%/hour. The time lag in Test Example 15 was 1.14 hours. The Na/B (mole ratio) of Test Example 15 is 1.19. The reaction was the particle stirring reaction. The time lag was improved. A good reaction yield was resulted.

The results of Test Example 12 to Test Example 15 are summarized in Table 4. FIG. 12 is the SEM mapping image of the product of Test Example 12 with the post-evacuation heating under the tightly sealed condition.

TABLE 4

| No. | Raw material Al [g] | Borate raw material $NaBO_2$ [g] | NaOH [g] | Additive [g] | Na/B (mol ratio) | Premix condition (temp/time [Hr]) | Sealed heating condition (atmosphere/ time [Hr]) | Heating temperature [° C.] | Stirring time [Hr] | Reaction rate (at 10% yield) [%/Hr] | Time lag [Hr] | Reaction yield [%] |
|---|---|---|---|---|---|---|---|---|---|---|---|---|
| Test Example 12 | 3.82 | 5.82 | 0.10 | NaF: 0.62 | 1.19 | — | Vacuum/1.05 | 530 | 5.5 | 161 | 1.48 | 71.2 |
| Test Example 13 | 3.82 | 5.82 | 0.10 | NaF: 0.62 | 1.19 | Room temp/2.0 | Vacuum/0.55 | 530 | 3.2 | 200 | 0.53 | 62.4 |
| Test Example 14 | 11.45 | 17.46 | — | NaF: 3.25 | 1.29 | — | $H_2$/0.54 | 510 | 23.8 | 186 | 1.07 | 88.3 |
| Test Example 15 | 3.81 | 5.82 | 0.10 | NaF: 0.62 | 1.19 | — | $H_2$/0.54 | 531 | 5.0 | 97 | 1.14 | 62.2 |

As can be seen in Table 4, when the second step was heated under the tightly sealed condition as part of the fourth pretreatment, an improvement in the time lag was recognized. Among these, Test Example 13, in which at the first step after the mixture excluding sodium borate was kept at room temperature, which was followed by at the second step the post-evacuation heating under the tightly sealed condition, showed good results in terms of the time lag and reaction rate. Here, because of the tightly sealed condition, the water cannot escape; and thus, not only the oxide film is newly formed but also the fluoride reacts with the water to form hydrogen fluoride (HF), which is changed to a hydrogen fluoride gas to form aluminum fluoride on the aluminum surface, thereby leading to formation of the NaAlF layer. As a result, the effect on improvement in the time lag until start of the reaction was obtained.

What is claimed is:

1. A method for producing sodium borohydride, the method comprising:

mixing an aluminum powder and a fluoride powder and carrying out a pretreatment thereof at 100° C. or higher and 330° C. or lower; and after the pretreatment, adding and mixing a sodium borate, charging the resulting mixture into a tightly sealed vessel, introducing a hydrogen gas, and carrying out a heat treatment by heating the tightly sealed vessel at 490° C. or higher and 560° C. or lower.

2. The method for producing sodium borohydride according to claim 1, wherein the sodium borate is one or more substances selected from sodium metaborate and sodium tetraborate.

3. The method for producing sodium borohydride according to claim 1, wherein the fluoride powder is one or more substances selected from sodium fluoride (NaF), sodium hexafluoroaluminate ($Na_3AlF_6$), potassium fluoride (KF), potassium aluminum fluoride ($KAlF_4$), aluminum fluoride ($AlF_3$), and lithium fluoride (LiF).

4. The method for producing sodium borohydride according to claim 1, wherein a mole ratio of aluminum in the aluminum powder to boron in the sodium borate is 4/3 or more.

5. The method for producing sodium borohydride according to claim 1, wherein a mole ratio of a total amount by mole of an alkali metal and an alkali earth metal, and an alkali metal and an alkali earth metal included in the sodium borate to an amount by mole of boron included in the sodium borate is 1.0 or more and 1.3 or less.

6. A method for producing sodium borohydride, the method comprising:

mixing an aluminum powder, sodium hydroxide, and a fluoride powder under an atmosphere of 10% or less of humidity and carrying out a pretreatment thereof at 100° C. or higher and 330° C. or lower; and after the pretreatment, adding and mixing a sodium borate, charging the resulting mixture into a tightly sealed vessel, introducing a hydrogen gas, and carrying out a heat treatment by heating the tightly sealed vessel at 490° C. or higher and 560° C. or lower.

* * * * *